US012057985B2

United States Patent
Sakhnini et al.

(10) Patent No.: US 12,057,985 B2
(45) Date of Patent: Aug. 6, 2024

(54) TECHNIQUES FOR PARTIAL TRANSMIT SEQUENCE TRANSMISSION USING MULTI-MODE INDEX MODULATION

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 18/063,970

(22) Filed: Dec. 9, 2022

(65) Prior Publication Data

US 2024/0195671 A1 Jun. 13, 2024

(51) Int. Cl.
*H04L 27/26* (2006.01)
*H04L 5/00* (2006.01)
*H04L 27/38* (2006.01)

(52) U.S. Cl.
CPC ........ *H04L 27/2628* (2013.01); *H04L 5/0019* (2013.01); *H04L 27/3872* (2013.01)

(58) Field of Classification Search
CPC H04L 27/2628; H04L 5/0019; H04L 27/3872
See application file for complete search history.

(56) References Cited

U.S. PATENT DOCUMENTS

| | | | | |
|---|---|---|---|---|
| 2001/0036151 A1* | 11/2001 | Cimini, Jr. | .......... | H04L 27/2615 370/208 |
| 2003/0202460 A1* | 10/2003 | Jung | ................... | H04L 27/2621 370/480 |
| 2011/0090972 A1* | 4/2011 | Jong-Seon | .......... | H04L 27/2621 375/341 |
| 2018/0183648 A1* | 6/2018 | Shimizu | ................ | H04L 5/0048 |

OTHER PUBLICATIONS

Dan et al. "Performance of Subcarrier-index-modulation OFDM with Partial Transmit Sequences for PAPR reduction" Published in " 2018 IEEE 87th Vehicular Technology Conference (VTC Spring)". Accessed from https://ieeexplore.ieee.org/document/8417538 on Mar. 23, 2024. (Year: 2018).*

* cited by examiner

*Primary Examiner* — David S Huang
(74) *Attorney, Agent, or Firm* — Dalei Dong; Holland & Hart LLP

(57) ABSTRACT

Methods, systems, and devices for wireless communications are described. A transmitting wireless device may identify different sets of bits that are included in information bits of a signal to be transmitted. For example, a first set of bits may be used as an index for a second set of bits, and the second set of bits may include multiple groups of bits, where each group may have a same size (e.g., a same quantity of bits). Based on the groups of bits having the same size, the transmitting wireless device may obtain candidate partial transmit sequences (PTSs) based on applying phase rotations to respective inverse Fast Fourier Transform (IFFT) outputs associated with each group of bits. The transmitting wireless device may select a PTS from the candidate PTSs and may transmit the signal including the information bits to a receiving wireless device using the selected PTS.

30 Claims, 19 Drawing Sheets

TECHNIQUES FOR PARTIAL TRANSMIT SEQUENCE TRANSMISSION USING MULTI-MODE INDEX MODULATION

FIELD OF DISCLOSURE

The following relates to wireless communications, including techniques for partial transmit sequence (PTS) transmission using multi-mode index modulation (IM).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for partial transmit sequence (PTS) transmission using multi-mode index modulation (IM). For example, a transmitting wireless device may partition one or more information bits of a signal into a first set of bits (e.g., index bits) indicating an index of a second set of bits (e.g., constellation bits), where the second set of bits are modulated according to a modulation scheme and the first set of bits are implicitly conveyed (e.g., based on the index). As an example, the second set of bits may include two or more groups of bits, where respective subcarriers may include modulation symbols associated with a different group of the two or more groups, and the modulation symbols may be orthogonal with respect to one another. In some aspects, each of the two or more groups of bits may have a same size (e.g., a same quantity of bits), which may enable the use of both multi-mode IM (e.g., multi-mode orthogonal frequency-division multiplexing (OFDM) IM) and PTS for the transmission of the signal. For example, the transmitting device may modify one or more of the index bits associated with the first set of bits to ensure each group of the two or more groups of bits to have the same size. Further, the transmitting wireless device may obtain candidate PTSs by applying phase rotations to outputs of respective inverse Fast Fourier Transforms (IFFTs) for each group of bits and then adding the phase-rotated outputs. The transmitting wireless device may transmit the signal according to a PTS from the candidate PTSs with a relatively lowest peak-to-average-power ratio (PAPR).

A method for wireless communication at a wireless device is described. The method may include identifying a first set of multiple bits of information bits of a signal, the first set of multiple bits indicating an index associated with a second set of multiple bits of the information bits of the signal, identifying the second set of multiple bits, where the second set of multiple bits includes a first group of bits and a second group of bits, obtaining a set of multiple candidate PTSs based on a first phase rotation applied to a first output of an IFFT of the first group of bits and a second phase rotation applied to a second output of an IFFT of the second group of bits, the first group of bits and the second group of bits having a same size, and transmitting the signal based on selecting a PTS from the set of multiple candidate PTSs.

An apparatus for wireless communication at a wireless device is described. The apparatus may include a processor, memory coupled with the processor, and instructions stored in the memory. The instructions may be executable by the processor to cause the apparatus to identify a first set of multiple bits of information bits of a signal, the first set of multiple bits indicating an index associated with a second set of multiple bits of the information bits of the signal, identify the second set of multiple bits, where the second set of multiple bits includes a first group of bits and a second group of bits, obtain a set of multiple candidate PTSs based on a first phase rotation applied to a first output of an IFFT of the first group of bits and a second phase rotation applied to a second output of an IFFT of the second group of bits, the first group of bits and the second group of bits having a same size, and transmit the signal based on selecting a PTS from the set of multiple candidate PTSs.

Another apparatus for wireless communication at a wireless device is described. The apparatus may include means for identifying a first set of multiple bits of information bits of a signal, the first set of multiple bits indicating an index associated with a second set of multiple bits of the information bits of the signal, means for identifying the second set of multiple bits, where the second set of multiple bits includes a first group of bits and a second group of bits, means for obtaining a set of multiple candidate PTSs based on a first phase rotation applied to a first output of an IFFT of the first group of bits and a second phase rotation applied to a second output of an IFFT of the second group of bits, the first group of bits and the second group of bits having a same size, and means for transmitting the signal based on selecting a PTS from the set of multiple candidate PTSs.

A non-transitory computer-readable medium storing code for wireless communication at a wireless device is described. The code may include instructions executable by a processor to identify a first set of multiple bits of information bits of a signal, the first set of multiple bits indicating an index associated with a second set of multiple bits of the information bits of the signal, identify the second set of multiple bits, where the second set of multiple bits includes a first group of bits and a second group of bits, obtain a set of multiple candidate PTSs based on a first phase rotation applied to a first output of an IFFT of the first group of bits and a second phase rotation applied to a second output of an IFFT of the second group of bits, the first group of bits and the second group of bits having a same size, and transmit the signal based on selecting a PTS from the set of multiple candidate PTSs.

Some examples of the method, apparatuses, and non-transitory computer-readable medium described herein may further include operations, features, means, or instructions for transmitting an indication of the first phase rotation and the second phase rotation based on selecting the first phase rotation for the first group of bits and the second phase rotation for the second group of bits.

Some examples of the method, apparatuses, and non-transitory computer-readable medium described herein may further include operations, features, means, or instructions for identifying, for a time interval, a threshold quantity of bits for the first group of bits and the second group of bits, where the first group of bits and the second group of bits may have the same size based on the first group of bits including at least the threshold quantity of bits during the time interval and the second group of bits including at least the threshold quantity of bits during the time interval.

In some examples of the method, apparatuses, and non-transitory computer-readable medium described herein, the threshold quantity of bits may be based on one or more statistics associated with the information bits.

In some examples of the method, apparatuses, and non-transitory computer-readable medium described herein, the threshold quantity of bits corresponds to a minimum quantity of bits of either the first group of bits or the second group of bits.

Some examples of the method, apparatuses, and non-transitory computer-readable medium described herein may further include operations, features, means, or instructions for determining a first quantity of bits for a first subset of bits of the first set of multiple bits, the first quantity of bits being based on a product of the threshold quantity of bits and a quantity of groups associated with the second set of multiple bits.

Some examples of the method, apparatuses, and non-transitory computer-readable medium described herein may further include operations, features, means, or instructions for determining a second quantity of bits for a second subset of bits of the first set of multiple bits, the second quantity of bits including a difference between a total quantity of bits of the first set of multiple bits and the first quantity of bits of the first subset of bits, where the first set of multiple bits includes the first subset of bits and the second subset of bits and selecting values for the second subset of bits for indicating the index associated with the second set of multiple bits, where the first group of bits and the second group of bits may have the same size based on the selected values.

Some examples of the method, apparatuses, and non-transitory computer-readable medium described herein may further include operations, features, means, or instructions for identifying one or more bits for reassignment from the first group of bits to the second group of bits, the one or more bits being identified based on a difference between a first original quantity of bits of the first group of bits and a second original quantity of bits of the second group of bits, where the first original quantity of bits may be different than the second original quantity of bits and determining the values for the second subset of bits based on the identified one or more bits for reassignment.

Some examples of the method, apparatuses, and non-transitory computer-readable medium described herein may further include operations, features, means, or instructions for determining the values for the second subset of bits based on randomly selecting a portion of bits from the first group of bits for reassignment to the second group of bits.

In some examples of the method, apparatuses, and non-transitory computer-readable medium described herein, the second subset of bits includes one or more dummy bits.

In some examples of the method, apparatuses, and non-transitory computer-readable medium described herein, the first quantity of bits for the first subset of bits further includes one or more bits from a second subset of bits of the first set of multiple bits and the one or more bits include bits that may be located after a bit of the second subset of bits that may have a modified value.

Some examples of the method, apparatuses, and non-transitory computer-readable medium described herein may further include operations, features, means, or instructions for transmitting an indication of the quantity of bits for the first subset of bits.

In some examples of the method, apparatuses, and non-transitory computer-readable medium described herein, obtaining the set of multiple candidate PTSs may include operations, features, means, or instructions for obtaining a sum of the first output and the second output and generating the set of multiple candidate PTSs in accordance with the obtained sum.

Some examples of the method, apparatuses, and non-transitory computer-readable medium described herein may further include operations, features, means, or instructions for selecting the PTS from the set of multiple candidate PTSs based on comparing respective peak-to-average-power ratios for the set of multiple candidate PTSs, where the selected PTS may be associated with a lowest PAPR of the respective PAPRs.

In some examples of the method, apparatuses, and non-transitory computer-readable medium described herein, the first group of bits may be orthogonal to the second group of bits based on one or more modulation schemes.

A method for wireless communication is described. The method may include receiving a first set of multiple bits and a second set of multiple bits in accordance with a PTS, the first set of multiple bits indicating an index associated with the second set of multiple bits in at least one subcarrier, and the second set of multiple bits including a first group of bits and a second group of bits and combining the first set of multiple bits and the second set of multiple bits based on the PTS to obtain information bits of a signal.

An apparatus for wireless communication is described. The apparatus may include a processor, memory coupled with the processor, and instructions stored in the memory. The instructions may be executable by the processor to cause the apparatus to receive a first set of multiple bits and a second set of multiple bits in accordance with a PTS, the first set of multiple bits indicating an index associated with the second set of multiple bits in at least one subcarrier, and the second set of multiple bits including a first group of bits and a second group of bits and combine the first set of multiple bits and the second set of multiple bits based on the PTS to obtain information bits of a signal.

Another apparatus for wireless communication is described. The apparatus may include means for receiving a first set of multiple bits and a second set of multiple bits in accordance with a PTS, the first set of multiple bits indicating an index associated with the second set of multiple bits in at least one subcarrier, and the second set of multiple bits including a first group of bits and a second group of bits and means for combining the first set of multiple bits and the second set of multiple bits based on the PTS to obtain information bits of a signal.

A non-transitory computer-readable medium storing code for wireless communication is described. The code may include instructions executable by a processor to receive a first set of multiple bits and a second set of multiple bits in accordance with a PTS, the first set of multiple bits indicating an index associated with the second set of multiple bits in at least one subcarrier, and the second set of multiple bits including a first group of bits and a second group of bits and combine the first set of multiple bits and the second set of multiple bits based on the PTS to obtain information bits of a signal.

Some examples of the method, apparatuses, and non-transitory computer-readable medium described herein may further include operations, features, means, or instructions for receiving an indication of a first phase rotations for the first group of bits and a second phase rotation for the second group of bits.

Some examples of the method, apparatuses, and non-transitory computer-readable medium described herein may further include operations, features, means, or instructions for receiving an indication of a quantity of bits for a first subset of bits of the first set of multiple bits.

In some examples of the method, apparatuses, and non-transitory computer-readable medium described herein, the first group of bits may be orthogonal to the second group of bits based on one or more modulation schemes.

DETAILED DESCRIPTION

Figure 1:
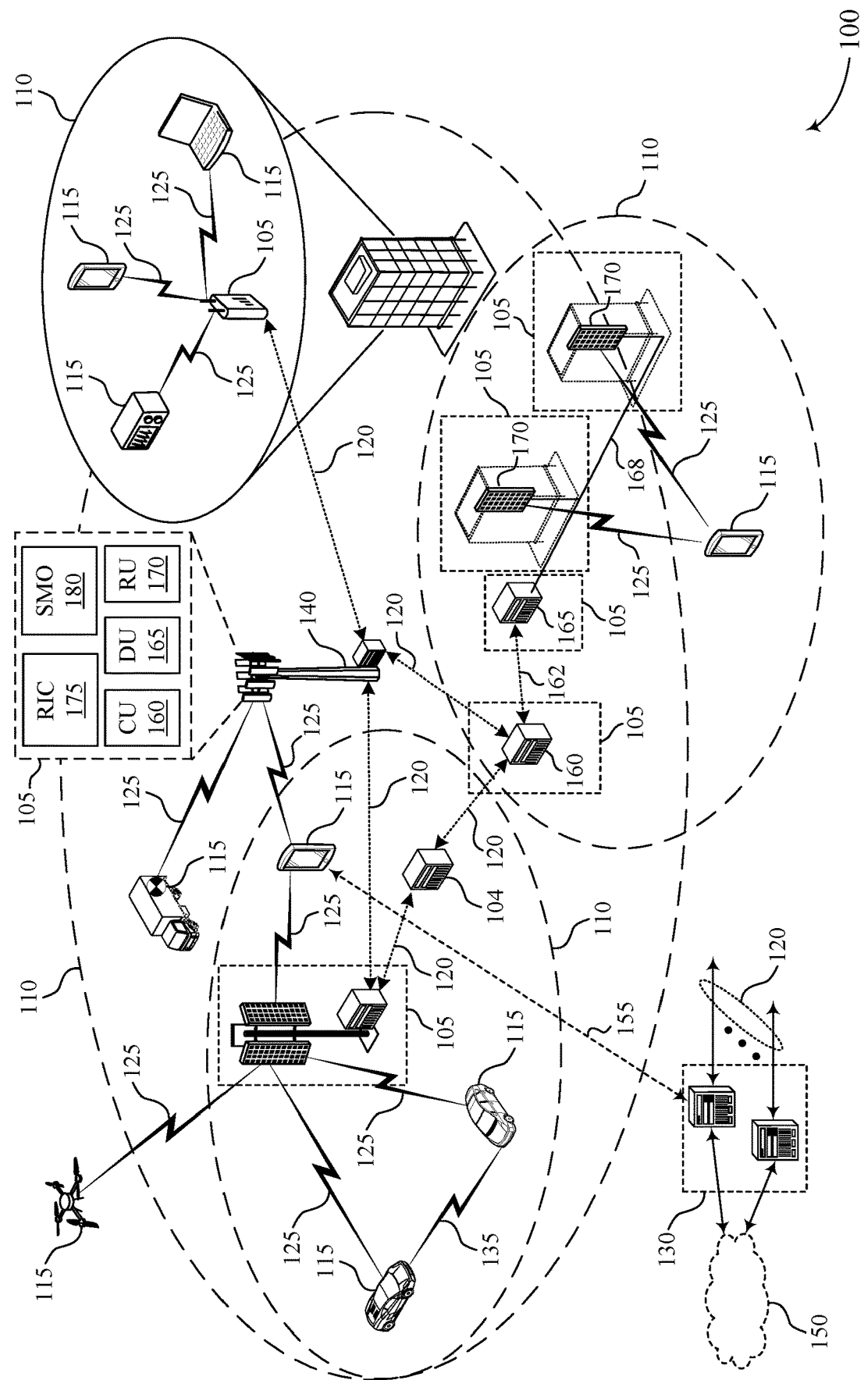
FIG. 1 illustrates an example of a wireless communications system that supports techniques for partial transmit sequence (PTS) transmission using multi-mode index modulation (IM) in accordance with various aspects of the present disclosure.

In some wireless communications systems, one or more wireless devices may use index modulation (IM) for one or more subcarriers (e.g., orthogonal frequency-division multiplexing (OFDM) subcarriers). As one example (e.g., for multi-mode IM), an incoming bit stream may be split into respective sets of bits, with a first set of bits serving as an index for a second set of bits. In such cases, the first set of bits may be implicitly transmitted, whereas the second set of bits may be further split into two or more groups of bits, and respective groups may have bits that are orthogonal to one another based on one or more modulation schemes (e.g., respective OFDM subcarriers may include modulation symbols associated with different groups, and the modulation symbols for each group may be orthogonal). IM may be implemented using various techniques, and IM techniques may generally include, for example, multi-mode IM (MM-OFDM-IM), spatial-domain IM (SD-IM), time-domain IM (TD-IM), frequency-domain IM (FD-IM), and single-carrier-based IM (SC-IM), among other examples. In any case, IM techniques may provide improved spectral efficiency of a transmitted signal.

In some examples, to reduce a peak-to-average-power ratio (PAPR) for transmissions, a transmitting device may use a partial transmit sequence (PTS) procedure, where modulation symbols are partitioned into multiple disjoint sets of a same size. The transmitting device may perform an inverse Fast Fourier Transform (IFFT) for each disjoint set to convert a signal from the frequency domain to the time domain. The transmitting device may further perform a phase rotation per IFFT output and then add the rotated IFFT outputs to obtain a set of candidate signals, which may be referred to as candidate PTSs. The transmitting device may select a candidate signal, or PTS, for transmissions that has a relatively lowest PAPR value.

Thus, PTS uses grouping and partitioning of the input data modulation symbols, and IM (e.g., MM-OFDM-IM) also uses grouping of the input data modulation symbols. However, there may not be a framework in place for wireless devices to use PTS with multi-mode OFDM-IM for communications, and current OFDM communication techniques may be improved upon.

In accordance with aspects described herein, a wireless communications system may implement techniques for combining IM techniques (e.g., MM-OFDM-IM) with PTS to simultaneously increase spectral efficiency, improve data rates, and reduce a PAPR of a transmission. For example, a transmitting wireless device may partition multiple information bits of a signal into a first set of bits (e.g., index bits) indicating an index of a second set of bits (e.g., constellation bits), where the second set of bits are modulated according to a modulation scheme and the first set of bits are implicitly conveyed (e.g., based on the index). The second set of bits may include two or more groups of bits, where bits of respective groups may be distinguishable from one another (e.g., orthogonal) based on one or more modulation schemes applied to the second set of bits. In some cases, the groups of bits of the second set of bits may each have a same size (e.g., a same quantity of bits) or may be modified to have the same size through the use of the index bits. Based on the two or more groups of bits having the same size, the transmitting wireless device may obtain candidate PTSs by applying phase rotations to outputs of respective IFFTs for each group and then adding the phase rotated outputs. The transmitting wireless device may transmit the signal according to a PTS with a relatively lowest PAPR value. Thus, a transmitting device may use IM techniques to obtain multiple groups of bits having a same size, and then apply PTS techniques to obtain a signal for transmission to a receiving device. Such techniques may enable transmitted signals to achieve improved spectral efficiency while also reducing PAPR of a transmitted signal, thereby enabling enhanced wireless communications for transmitted signals. Put another way, the techniques described herein may enable transmitted signals to achieve the benefits provided by both IM techniques and PTS techniques.

Aspects of the disclosure are initially described in the context of wireless communications systems. Aspects of the disclosure are additionally described in the context of signal processing diagrams and process flows. Aspects of the disclosure are further illustrated by and described with reference to apparatus diagrams, system diagrams, and flowcharts that relate to techniques for PTS transmission using multi-mode IM.

FIG. 1 illustrates an example of a wireless communications system that supports techniques for PTS transmission using multi-mode IM in accordance with various aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for partial transmit sequence transmission using multi-mode index modulation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with some bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using some carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N4)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with some orientation (e.g., with respect to the antenna array of the transmitting device or receiving device, or with respect to some other orientation).

In some cases, the UE 115 or the network entity 105 may implement techniques for combining multi-mode IM with PTS. For example, the UE 115 or the network entity 105 may partition one or more information bits of a signal into first bits indicating an index for second bits, where the second bits are modulated according to one or more modulation schemes (e.g., amplitude/phase modulation schemes, or other techniques for achieving orthogonality between modulation symbols). The respective groups of the second bits may correspond to orthogonal modulation symbols that are carried by different subcarriers, and each group may have the same size (e.g., a same quantity of bits). The UE 115 or the network entity 105 may apply phase rotations to outputs of respective IFFTs for each group based on each group being the same size, and the UE 115 or the network entity 105 may add the phase rotated IFFT outputs to obtain multiple candidate PTSs. The UE 115 or the network entity 105 may transmit the signal according to a PTS with a relatively lowest PAPR value.

Figure 2:
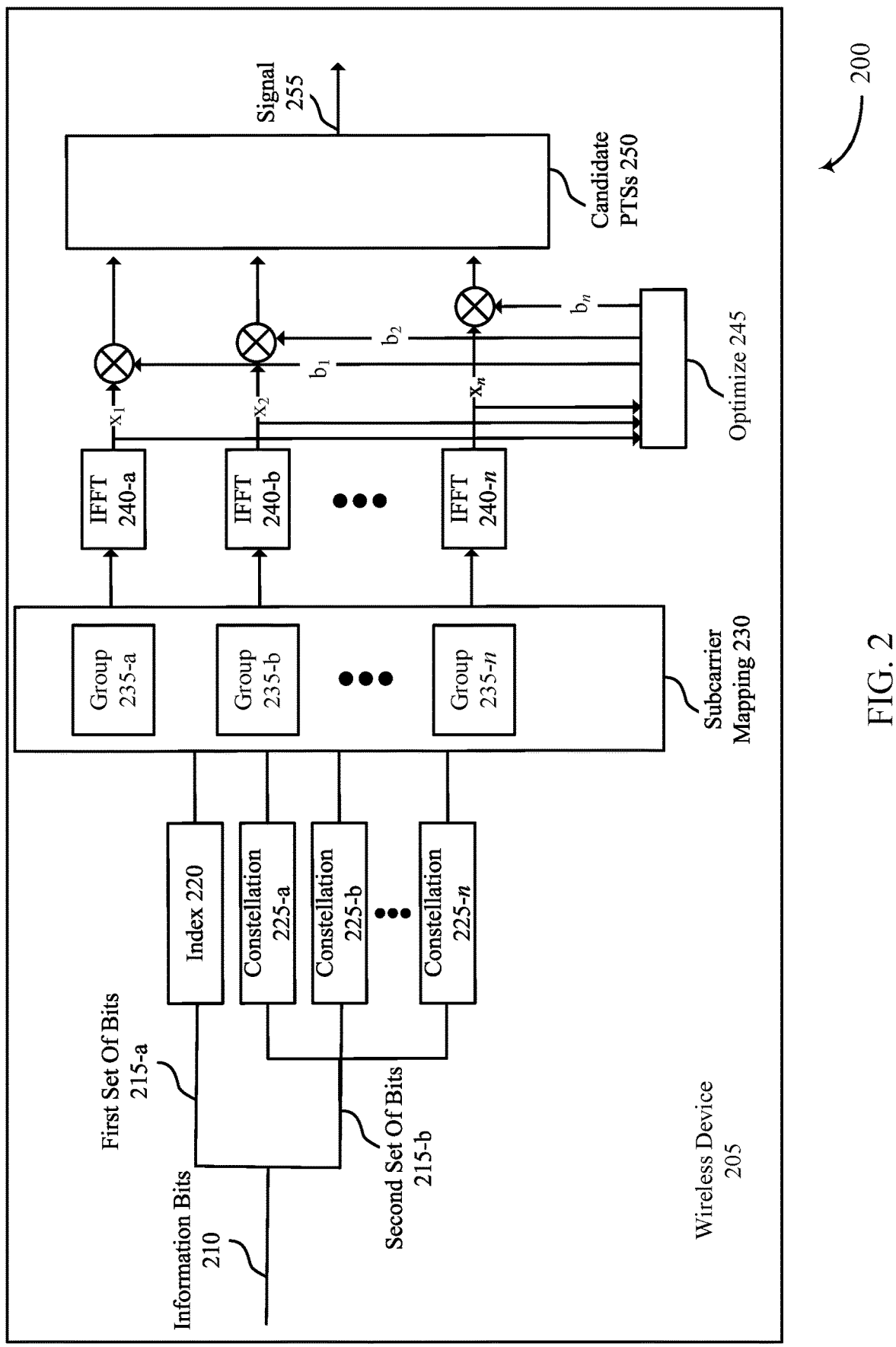
FIG. 2 illustrates an example of a signal processing diagram that supports techniques for PTS transmission using multi-mode IM in accordance with various aspects of the present disclosure.

FIG. 2 illustrates an example of a signal processing diagram that supports techniques for PTS transmission using multi-mode IM in accordance with various aspects of the present disclosure. The signal processing diagram 200 may implement aspects of the wireless communications system 100. For example, the signal processing diagram 200 may be implemented by a wireless device 205, which may be an example of a network entity 105 or a UE 115 as described with reference to FIG. 1. The wireless device 205 may be configured to perform a transmission of a signal by combining a PTS scheme with multi-mode IM for one or more subcarriers.

For IM, the wireless device 205 may generate a bit sequence (also referred to as a bit stream) including information bits 210, which may be split (e.g., divided, partitioned) into two sets of information bits. For example, the wireless device 205 may split the information bits 210 into a first set of bits 215-a (e.g., part 1 information bits) and a second set of bits 215-b (e.g., part 2 information bits). The wireless device 205 may convey (e.g., indicate) the first set of bits 215-a implicitly by index usage or activation patterns. In some examples, the first set of bits 215-a may be conveyed implicitly by the wireless device 205 using source-based IM (SBIM) (e.g., activation of subcarriers via FD-IM, activation of antennas via SD-IM (which may sometimes be referred to as spatial modulation (SM)), or activation of time slots via TD-IM). In some other examples, the wireless device 205 may implicitly convey the first set of bits 215-a using media-based modulation (MBM) (e.g., activation of channel states via channel-domain IM (CD-IM)).

In some cases, the wireless device 205 may modulate the second set of bits 215-b using an OFDM modulation scheme, where the wireless device 205 may transform a block of symbols (e.g., time resources) into an OFDM signal based on a relationship between a symbol duration and a subcarrier spacing (e.g., a spacing between subcarrier frequencies used for the transmission). The OFDM modulation scheme may include amplitude and phase modulation (APM) schemes, among other examples (e.g., any other means of orthogonality).

In some cases, the wireless device 205 may use the OFDM modulation scheme to encode data on multiple carrier frequencies, or subcarriers. The transmitting wireless device may use a modulation scheme to map the bits from the second set of bits 215-b to respective modulation symbols, where each group of bits may be mapped to a different set of modulation symbols, and each group (e.g., prior to mapping bits to subcarriers) may be associated with respective constellation bits (e.g., constellation bits 225-a, constellation bits 225-b, through constellation bits 225-n) based on one or more modulation schemes used for modulating the data. The wireless device 205 may further split the second set of bits 215-b into two or more groups 235 (e.g., a group 235-a, a group 235-b, through group 235-n) based on respective modulation symbols to which bits of respective groups 235 are mapped. The respective groups 235 may have bits that are orthogonal to one another based on the one or more modulation schemes.

In some cases, each of the first set of bits 215-a may serve as an index 220 for respective bits of the second set of bits 215-b, where the index identifies a group of two or more groups 235 to which the respective bits belong. For example, the second set of bits 215-b may be split into one or more groups 235. For transmissions with IM, a transmitting device (e.g., the wireless device 205) may use a subset of resources. For example, the transmitting device may use a subset of available subcarriers, antennas, time slots, or channel states for one or more signal transmissions. Thus, the transmitting device may not use the remaining resources for the associated transmission. In some instances, the wireless device 205 may implicitly convey bits of the first set of bits 215-a by the index usage or activation patterns.

In some cases, the wireless device 205 may support multi-mode IM without sub-block partition. For instance, the wireless device 205 may use L resources (e.g., subcarriers), and each of the subcarriers may have at least one orthogonal modulation symbols form a set of S orthogonal modulation symbols. That is, the OFDM subcarriers may carry modulation symbols belonging to one out of G groups, with each group having the at least one orthogonal modulation symbol from a set of S possible orthogonal/distinguishable modulation symbols, and each group may have a size of, for example, $\log_2 S$ bits.

The wireless device 205 may use the first set of bits 215-a as an index 220 to determine the one or more groups 235 for the second set of bits 215-b. In some examples, the wireless device 205 may calculate a quantity of bits that can be conveyed in the first set of bits 215-a according to Equation 1:

$$p_1 = \lceil \log_2(G) \rceil \cdot y \tag{1}$$

where $p_1$ is the quantity of bits in the first set of bits 215-a and y is the quantity of bits per subcarrier. Similarly, the wireless device 205 may use the second set of bits 215-b to determine the modulation symbol within the group 235. The wireless device 205 may calculate a quantity of bits in the second set of bits 215-b according to Equation 2:

$$p_2 = \log_2(S) \cdot y \tag{2}$$

where $p_2$ is the quantity of bits in the second set of bits 215-b. If there are L sub carriers, the wireless device 205 may calculate a total quantity of bits carried of the information bits 210 according to Equation 3:

$$m = L \times (\lceil \log_2(G) \rceil + \log_2(S)) \tag{3}$$

where m is the total quantity of bits carried of the information bits 210. In some instances, the wireless device 205 may use a lookup table to determine the mapping between the group 235 and the modulation symbols during a subcarrier mapping 230.

In some other cases, the wireless device 205 may support multi-mode IM with sub-block partition. In these cases, the wireless device 205 may first divide information bits 210 into different sub-blocks. Each of the sub-blocks may then be split into a first set of bits 215-a and a second set of bits 215-b. For example, the wireless device 205 may partition the L subcarriers into B sub-blocks, where each sub-block has a length of $L_{SB}$. In this way, the G orthogonal groups (e.g., the group 235-a, the group 235-b, through the group 235-n) may be within each sub-block. The concepts and techniques associated with multi-mode IM without sub-block partition may be applicable to multimode IM with sub-block partition, and vice-versa.

The wireless device 205 may use the first set of bits 215-a to determine the one or more groups 235 within a sub-block. In some examples, the quantity of bits that can be conveyed in the first set of bits 215-a may be calculated according to Equation 4:

$$p_1 = \left\lfloor \log_2 \prod_{b=0}^{B} \binom{L_{SB} - \sum_{j=0}^{b-1} k_j}{k_b} \right\rfloor \cdot y \tag{4}$$

where $p_1$ is the quantity of bits in the first set of bits 215-$a$ and $k_j$ is the quantity of subcarriers in a respective group, j. Similarly, the wireless device 205 may use the second set of bits 215-$b$ to determine the modulation symbol within each group 235. The wireless device 205 may calculate a quantity of bits in the second set of bits 215-$b$ according to Equation 5:

$$p_2 = \sum_{i=0}^{G-1} k_i \log_2(S_i) \cdot y \quad (5)$$

where $p_2$ is the quantity of bits in the second set of bits 215-$b$. If there are B sub-blocks, the wireless device 205 may calculate a total quantity of bits carried of the information bits 210 according to Equation 6:

$$m = B \times \left( \left\lfloor \log_2 \prod_{b=0}^{B} \left( \frac{L_{SB} - \sum_{j=0}^{b-1} k_j}{k_b} \right) \right\rfloor + \sum_{i=0}^{G-1} k_i \log_2(S_i) \right) \quad (6)$$

where m is the total quantity of bits carried of the information bits 210.

In some cases, the wireless device 205 may use a lookup table to determine the mapping between the group 235 and the modulation symbols during the subcarrier mapping 230. The lookup tables for the multi-mode IM with sub-block partitioning and without sub-block partitioning may be configured at the wireless device 205, or otherwise defined (e.g., predefined).

In some cases, OFDM techniques may result in a relatively high PAPR. Thus, the wireless device 205 may implement a PTS scheme, which may reduce the PAPR for OFDM transmission. For the PTS scheme, the wireless device 205 may partition (e.g., through segmentation methods such as interleaving, adjacent, or pseudo-random selection) the modulation symbols into multiple groups 235 (e.g., disjoint sets) of the same size. For example, the group 235-$a$, the group 235-$b$, through the group 235-$n$ may each have the same size (e.g., quantity of bits).

The wireless device 205 may perform an IFFT for each group 235. The wireless device 205 may further perform a phase rotation for each IFFT output. For example, the wireless device 205 may perform an IFFT 240-$a$ for the group 235-$a$ and obtain an IFFT output $x_1$. At 245, the wireless device 205 may optimize the IFFT output $x_1$ and obtain a rotated IFFT output $b_1$. Similarly, the wireless device 205 may perform an IFFT 240-$b$ for the group 235-$b$ and obtain an IFFT output $x_2$. The wireless device 205 may optimize the IFFT output $x_2$ and obtain a rotated IFFT output $b_2$. Further, the wireless device 205 may perform an IFFT 240-$n$ for the group 235-$n$ and obtain an IFFT output $x_3$. The wireless device 205 may optimize the IFFT output $x_n$ and obtain a rotated IFFT output bn. To optimize the phase, the wireless device 205 may utilize a variety of methods including selecting a random phase between 0 and $2\pi$. The phase rotation for each of the groups (e.g., the group 235-$a$, the group 235-$b$, through group 235-$n$, or any other group) may be different or the same based on the selection.

In some cases, the wireless device 205 may add the rotated IFFT outputs to obtain a set of candidate PTSs 250. For example, the wireless device 205 may partition an input data block (e.g., the second set of bits 215-$b$) into groups 235 according to Equation 7:

$$X = \Sigma_v X_v \quad (7)$$

where X is the input data block, $X_v$ is the respective group 235, and the subscript v is = {1, 2, . . . , quantity of groups}. For instance, with reference to FIG. 2, the quantity of groups may be 3. Further, the wireless device 205 may apply a phase rotation to each of the IFFT outputs by multiplying the IFFT output by a phase rotation factor $b_v$. The wireless device 205 may add the rotated IFFT outputs due to the linearity of the IFFT operation. Thus, the wireless device 205 may calculate the sum of the rotated IFFT outputs according to Equation 8:

$$x = \mathrm{IFFT}\{\Sigma_v b_v X_v\} = \Sigma_v b_v \mathrm{IFFT}\{X_v\} = \Sigma_v b_v x_v \quad (8)$$

where x is a time-domain signal 255 obtained from the sum of the rotated IFFT outputs and $x_v$ is the IFFT output for the respective groups 235. The wireless device 205 may select one of the candidate PTSs 250 for a signal 255 and may transmit the signal 255 according to a PTS with the relatively lowest PAPR value.

The wireless device 205 may implement aspects of the signal processing diagram 200, which may combine a multi-mode OFDM-IM with a PTS scheme. In some cases, the PTS scheme may involve grouping and partition of the input data modulation symbols obtained from the second set of bits 215-$b$. Similarly, multi-mode OFDM-IM may also involve grouping of the input data modulation symbols. For instance, the wireless device 205 may modulate the second set of bits 215-$b$ through multi-mode OFDM-IM and obtain the groups 235. The wireless device 205 may use the same groups 235 in the PTS scheme. In this manner, the wireless device 205 may use the multi-mode OFDM-IM to improve spectral efficiency (e.g., of $\lceil \log_2(G) \rceil$ bits/subcarrier improvement) and the PTS scheme to reduce PAPR. However, for a PTS scheme, the groups 235 may have a same size, while in some cases the groups 235 obtained from the multi-mode OFDM-IM may not be the same size. Thus, the wireless device 205 may adjust the size of the groups 235 from the multi-mode IM to ensure an equal quantity of bits prior to implementing the PTS scheme, which is described in further detail with respect to FIG. 3.

Figure 3:
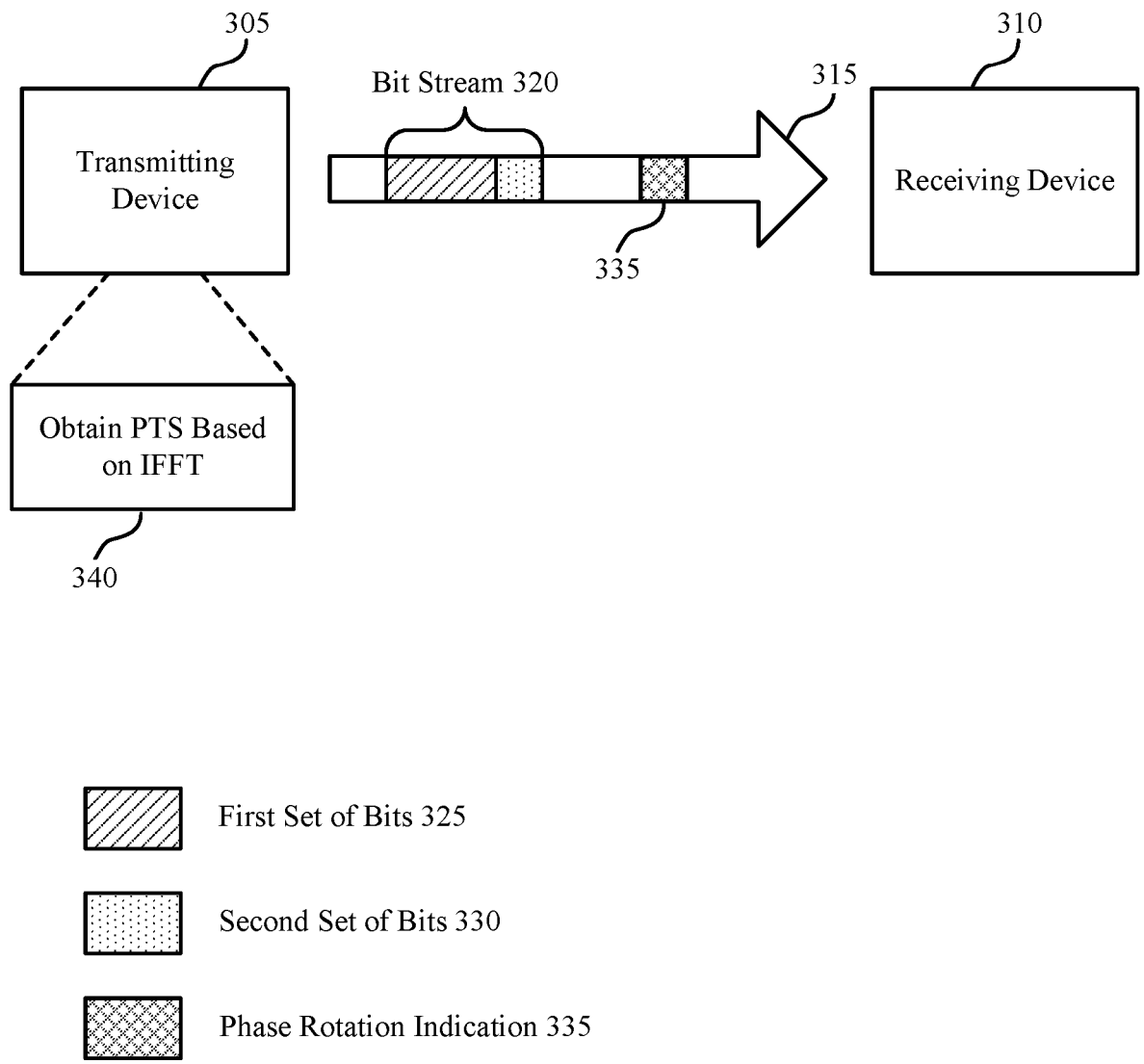
FIG. 3 illustrates an example of a wireless communications system that supports techniques for PTS transmission using multi-mode in accordance with various aspects of the present disclosure.

FIG. 3 illustrates an example of a wireless communications system that supports techniques for PTS transmission using multi-mode IM in accordance with various aspects of the present disclosure. The wireless communications system 300 may implement aspects of the wireless communications system 100 and the signal processing diagram 200. For example, the wireless communications system 300 may include a transmitting device 305 and a receiving device 310 which may be examples of either a network entity 105 or a UE 115 as described with reference to FIG. 1. The transmitting device 305 may transmit one or more signals via a communication link 315, which may be an example of a wireless communication link 125, as described with reference to FIG. 1. The transmitting device 305 and the receiving device 310 may be configured to support wireless communications using multi-mode IM with a PTS scheme.

In some cases, the transmitting device 305 may send a bit stream 320 to the receiving device 310. The bit stream 320 may include one or more information bits, which may be divided into a first set of bits 325 (e.g., the first set of bits 215-$a$ as described with reference to FIG. 2) and a second set of bits 330 (e.g., the second set of bits 215-$b$ as described with reference to FIG. 2, which may include data and/or other information). The first set of bits 325 and the second set of bits 330 may include one or more index bits and one or more data bits, respectively. For example, the bit stream 320 may include 64 bits, which may be segmented into equal parts or unequal parts (e.g., based on a quantity of bits used for indexing). The bit stream 320 may include any quantity and combination of bits. In some cases, the value of the first set of bits 325 may indicate an index of a group for the second set of bits 330. For example, an index value of "00" may indicate that portion (e.g., a first subset) of the second set of bits 330 (e.g., data bits) belong to a first group (e.g., Group A), an index value of "01" may indicate that a second subset of the second set of bits 330 belong to a second group (e.g., Group B), an index value of "10" may indicate that a third subset of the second set of bits 330 belong to a third group (e.g., Group C) and an index value of "11" may indicate that a fourth subset of the second set of bits 330 belong to a fourth group (e.g., Group D). In some examples, each of the groups may not be the same size (e.g., may not have the same quantity of bits). Thus, the quantity of bits in each group may be equalized in order to apply a PTS scheme to the groups, as described with reference to FIG. 2. In such examples, the transmitting device 305 may update the quantity of bits in each group via the first set of bits 325, such that the same quantity of bits per each multi-mode OFDM-IM group is the same. That is, a portion of the first set of bits 325 may be modified to reallocate bits between groups so that each of the groups of the second set of bits 330 has the same size. For instance, the transmitting device 305 may define a threshold (minimum) quantity of bits in a group $k_{min}$ per time allocation (e.g., time interval, symbol, mini slot, multi slot). In some examples, $k_{min}$ may be predefined based on a statistic of the input bits or may be based on the threshold (e.g., smallest) quantity of bits among each of the groups, among other examples.

The transmitting device 305 may restrict the quantity of information bits in the first set of bits 325 to be a threshold (e.g., minimum) quantity of bits in accordance with $G \cdot k_{min}$, where G is the quantity of groups. The restricted information bits in the first set of bits 325 may be a first subset of bits of the first set of bits 325. The receiving device 310 may determine the quantity of the first subset of bits, as well as the method used to restrict the information bits. For instance, the quantity of the first subset of bits, as well as the method used to restrict the information bits, may be transmitted by the transmitting device 305 via the communication link 315 or may be otherwise defined (e.g., predefined). Further, the remaining quantity of bits in the first set of bits 325 may be represented by $(p_1 - G \times k_{min})$, where $p_1$ is the total quantity of bits in the first set of bits 325. The remaining quantity of bits in the first set of bits 325 may be a second subset of bits of the first set of bits 325. The transmitting device 305 may select values for the second subset of bits of the first set of bits 325 so that the quantity of bits for each group is the same. For example, the transmitting device 305 may select values of the second subset of bits of the first set of bits 325 (e.g., after the restriction) based on bits to be added to/removed from respective groups such that each group has the same size. In some examples, the transmitting device 305 may randomly select a location of bits to move from a group (e.g., having a quantity of bits that exceeds the size) to another group (e.g., having a quantity of bits below the size). That is, the transmitting device 305 may move any bits between groups to enable the groups to have the same quantity of bits.

The transmitting device 305 may obtain, or select, a PTS based on a sum of phase-rotated IFFT outputs at 340, as described with reference to FIG. 2. The transmitting device 305 may apply the obtained or selected PTS using the groups from the multi-mode IM. For instance, the transmitting device 305 may perform an IFFT for each group of the multi-mode OFDM IM, apply a phase rotation to the output of the IFFT, and add the phase-rotated IFFT outputs to obtain candidate PTSs. The transmitting device 305 may transmit the communication link 315 using a PTS from the candidate PTSs. For example, the transmitting device 305 may select a PTS from the candidate PTSs with a relatively lowest PAPR. Further, the receiving device 310 may transmit a phase rotation indication 335 to the receiving device 310. The phase rotation indication 335 may indicate the phase rotations used when obtaining the candidate PTSs based on the sum or the phase rotated IFFT outputs at 340, which the receiving device 310 may use when decoding the bit stream 320.

In some cases, the receiving device 310 may not receive a portion of bits (e.g., a remaining quantity of bits) of the first set of bits 325, such as the first set of bits 325 that exceed a threshold quantity of the first set of bits 325 to ensure same size groups. Additionally, or alternatively, the receiving device 310 may discard one or more bits of the second subset of bits of the first set of 325. In some examples, the transmitting device 305 may mitigate spectral efficiency loss by transferring (e.g., removing) the second subset of bits of the first set of bits 325 until an index update.

Figure 4A:
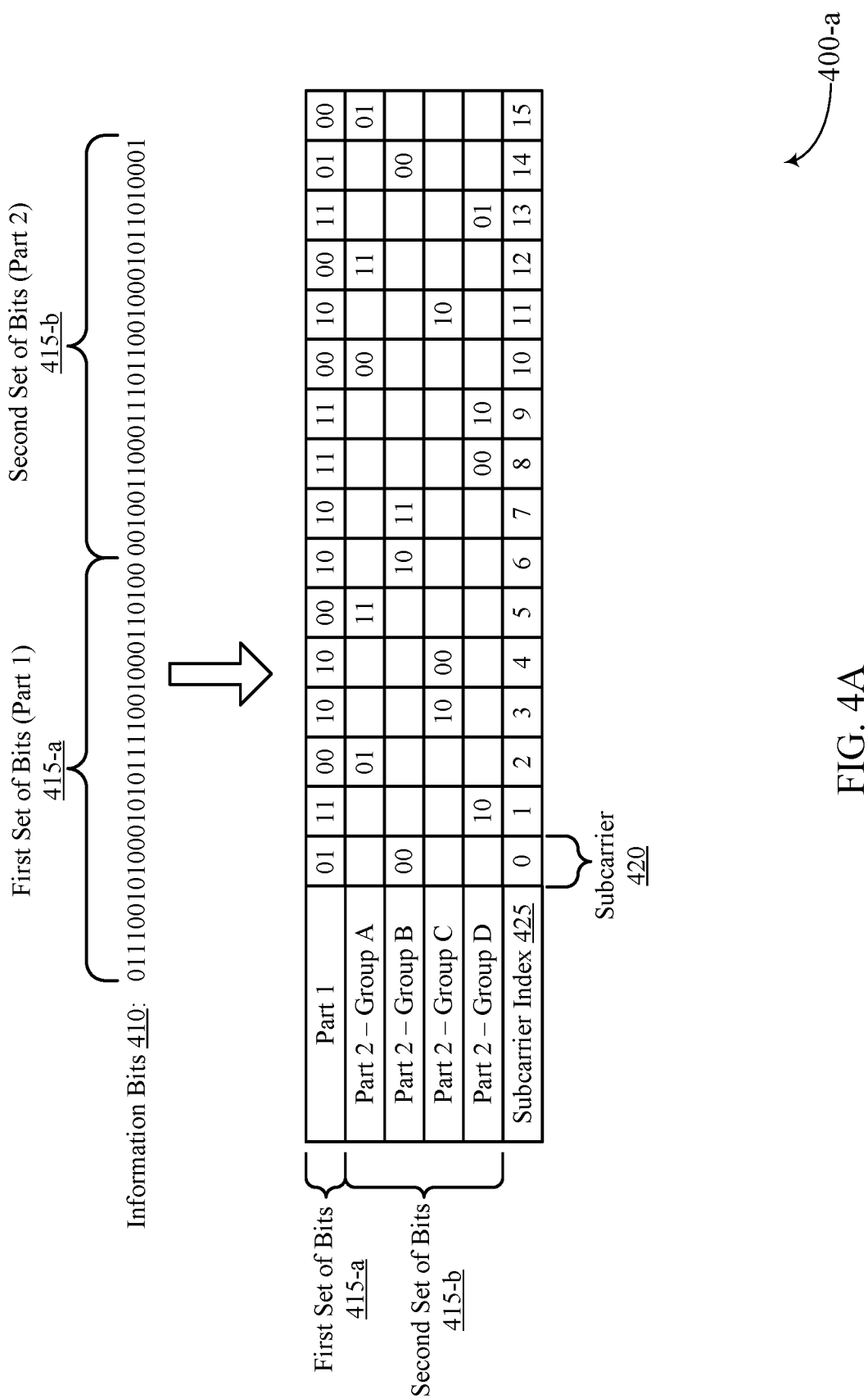
FIGS. 4A, 4B, and 4C illustrate examples of an index modification scheme that supports techniques for PTS transmission using multi-mode IM in accordance with various aspects of the present disclosure.
Figure 4B:
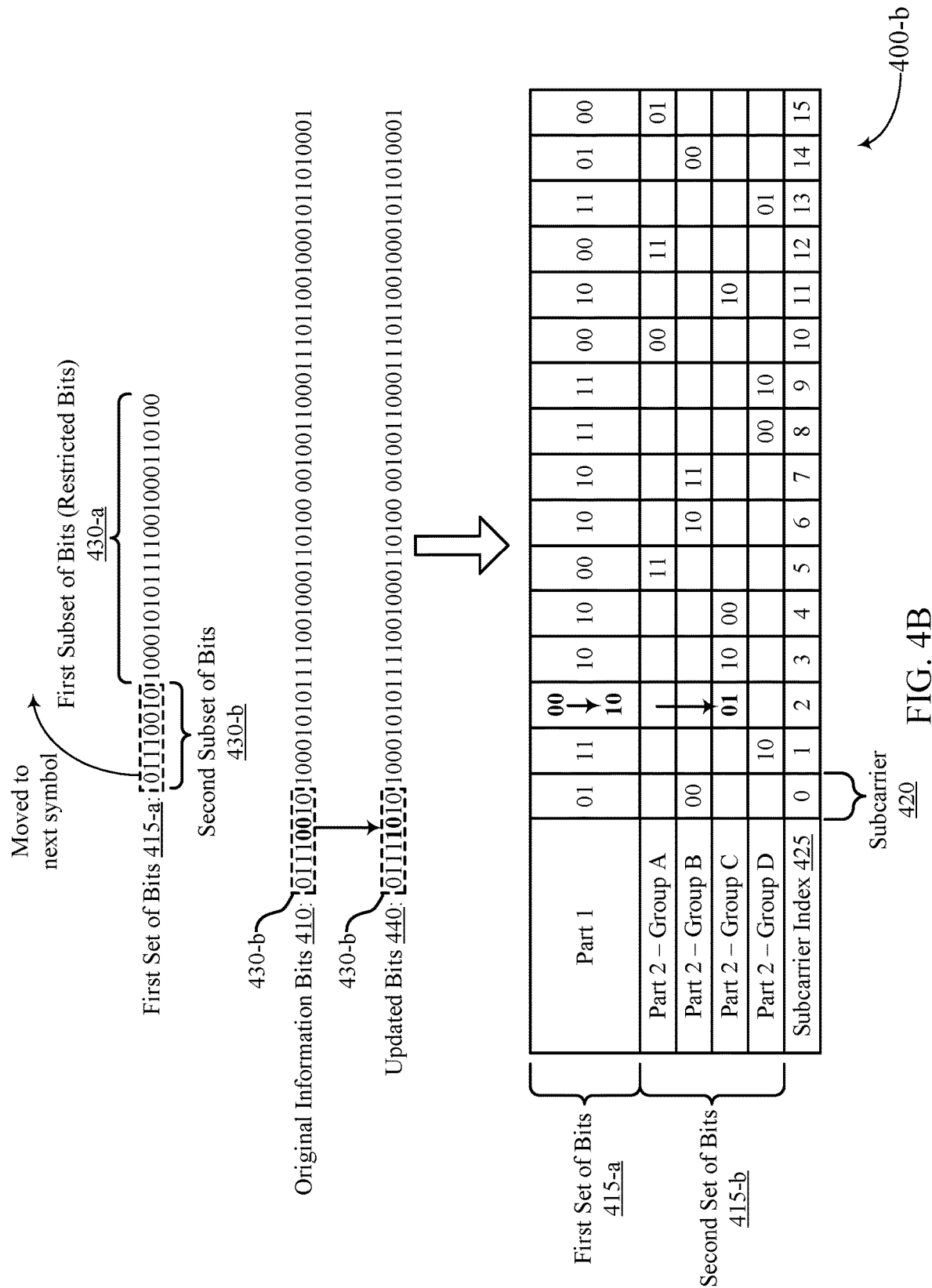
Figure 4C:
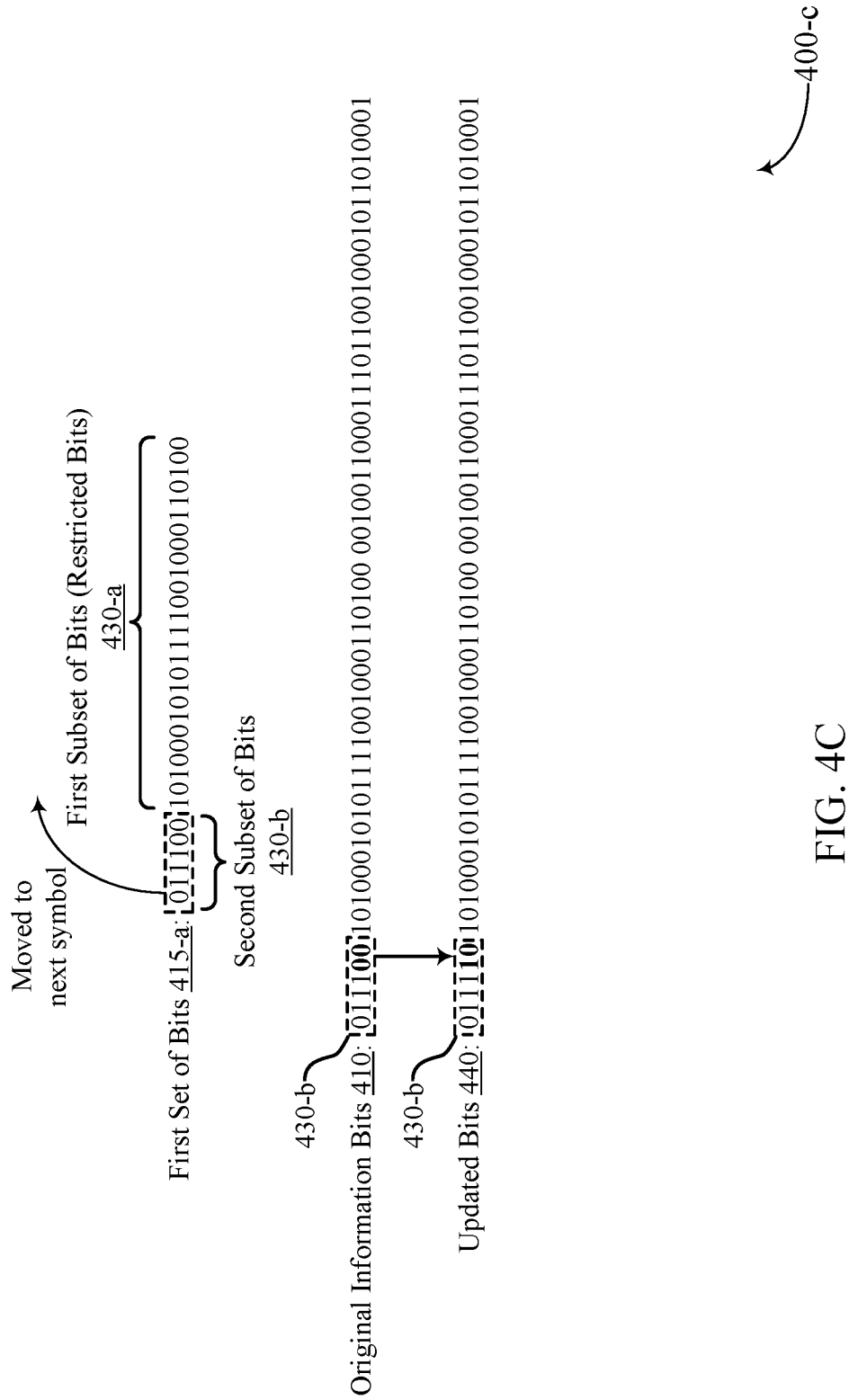

FIGS. 4A, 4B, and 4C illustrate examples of an index modification scheme 400-a, 400-b, and 400-c that supports techniques for PTS transmission using multi-mode IM in accordance with various aspects of the present disclosure. The index modification scheme 400-a, 400-b, and 400-c may implement aspects of the wireless communications system 100, the signal processing diagram 200, and the wireless communications system 300. For example, the index modification scheme 400-a, 400-b, and 400-c may be used by a wireless device, such as a UE 115, a network entity 105, a wireless device 205, or a transmitting device 305, as described with reference to FIGS. 1, 2, and 3. The index modification scheme 400-a, 400-b, and 400-c may be used to achieve an equal quantity of bits in multiple groups of bits, which may enable the combined use of multi-mode IM and PTS techniques for enhanced wireless communications.

As described herein, multiple bits of a signal may be partitioned into a first set of bits and a second set of bits for multi-mode IM techniques. For example, information bits 410 of a signal to be transmitted by a wireless device may include a first set of bits 415-a (e.g., index bits, which may be referred to as Part 1 bits) and a second set of bits 415-b (e.g., modulated bits, which may be referred to as Part 2 bits). The first set of bits 415-a may be used as an index for the second set of bits 415-b such that the first set of bits 415-a may be implicitly signaled to a receiving device when the second set of bits 415-b are transmitted. In addition, the second set of bits 415-b may include two or more groups of bits (e.g., Group A, Group B, Group C, and Group D).

As illustrated by FIG. 4A, multiple subcarriers 420 (having respective subcarrier indices 425) may each include one or more bits of the second set of bits 415-b, and each subcarrier 420 may therefore include a modulation symbol for one group of the second set of bits 415-b. Here, each group may have one of multiple possible modulation symbols that are orthogonal with respect to the modulation symbols of another group. In some aspects, there may be a mapping between the modulation symbols for different groups of the second set of bits 415-b and an associated value of bits of the first set of bits 415-a in a subcarrier 420. As such, the first set of bits 415-a may provide an index indicating a group to which respective bits of the second set of bits 415-b belong.

In the example illustrated by FIG. 4A, the information bits 410 may include 64 total bits. The quantity of bits of the first set of bits 415-*a*, per subcarrier 420, may be determined, for example, using $\lceil \log_2(G) \rceil$, where G is the quantity of groups of the second set of bits 415-*b*. For instance, when G=4, each subcarrier includes two bits from the first set of bits 415-*a*. Thus, in this example, 32 bits may be used for the first set of bits 415-*a* (Part 1 bits) and 32 bits may be used for the second set of bits 415-*b* (Part 2 bits). Further, based on the index associated with the first set of bits 415-*a*, the respective groups of bits may each have a quantity of bits.

To utilize the multi-mode IM techniques with the PTS for enhanced wireless transmissions, each group of bits may have a same quantity of bits (e.g., Group A, Group B, Group C, and Group D may each be the same size). However, as shown in FIG. 4A, the different groups of bits from the second set of bits 415-*b* may sometimes have a different quantity of bits, which may be based on (e.g., a result of) the index provided by the first group of bits 415-*a*. For example, Group A may include 10 bits, Group B, may include 8 bits, Group C may include 6 bits, and Group D may include 8 bits. Thus, the wireless device may perform index modification techniques on the first set of bits 415-*a* to equalize the quantity of bits in each group.

The wireless device may determine a threshold (e.g., minimum) quantity of bits (e.g., $k_{min}$) for each group to obtain an equal quantity of bits in each group, where the threshold may be predefined or be based on a lowest quantity of bits in a group from the two or more groups of the second set of bits 415-*b*. As an example, the wireless device may define $k_{min}$=6 bits based on the quantity of bits (e.g., 6 bits) in Group C. Further, the wireless device may determine a threshold (e.g., maximum) quantity of bits to retain from the first set of bits 415-*a*. Here, as shown in FIG. 4B, the first set of bits 415-*a* may be split into a first subset of bits 430-*a* and a second subset of bits 430-*b*. The quantity of bits included in the first subset of bits 430-*a* may be based on the threshold, $k_{min}$, such that the first subset of bits 430-*a* may include $G \times k_{min}$ bits from the first set of bits 415-*a*. In the example of FIG. 4B, the first subset of bits 430-*a* may include 24 bits (e.g., $G \cdot k_{min}$=24 bits). The remaining bits (e.g., the second subset of bits 430-*b*) of the first set of bits 415-*a* may be moved to a subsequent symbol (e.g., for a transmission associated with that subsequent symbol). The information (bits) in the first subset of bits 430-*a* may remain the same, and may be implicitly signaled in accordance with multi-mode IM techniques.

Based on identifying the first subset of bits 430-*a* and the second subset of bits 430-*b*, one or more values of the second subset of bits 430-*b* may be modified or adjusted so that bits are moved between groups of the second set of bits 415-*b* in accordance with the index provided by the first set of bits 415-*a*. For example, values of the second subset of bits 430-*b* may be selected by the wireless device such that the groups have the same size (e.g., the same quantity of bits). In modifying the values of the second subset of bits 430-*b*, updated bits 440 may be used for the indexing and transmission of the information bits of the signal by the wireless device. In the example of FIG. 4B, the two index bits of the first set of bits 415-*a* associated with a third subcarrier 420 (e.g., a subcarrier 420 associated with a subcarrier index 425 of two (2)) may be modified to move one or more bits from Group A to Group C, thereby equalizing the bits in each group (e.g., Group A, Group B, Group C, and Group D each have 8 bits for transmission in the respective subcarriers 420).

In some examples, one or more other bits may be modified in the second subset of bits 430-*b* to equalize the quantity of bits in each group. Further, the bits of the first set of bits 415-*a* used as the second subset of bits 430-*a* may be randomly selected or may be in one or more locations different from the examples described herein. For instance, the second subset of bits 430-*b* may be located at the end of the first set of bits 415-*a*, and some value(s) of the second subset of bits 430-*b* may be selected to move one or more between groups. In some aspects, the bits included in the second subset of bits 430-*b* may be considered "dummy" bits (e.g., may not represent information from the original information bits 410). Though, as shown, the values of the bits used for the second subset of bits 430-*b* may be based on the original bits of the first set of bits 415-*a*.

In addition, and as shown in FIG. 4C, a different quantity of bits may be identified for the first subset of bits 430-*a* and the second subset of bits 430-*b*. For example, the only bits of the first set of bits 415-*a* that may be included in the second subset of bits 430-*b* (e.g., and moved to a subsequent symbol) may be the bits up until the last bit value is changed. For instance, and as illustrated, the fifth and sixth bit of the second subset of bits 430-*b* may be changed, and the remaining bits of the first set of bits 415-*a* may be included in the first subset of bits 430-*a* (e.g., the quantity of bits in the first subset of bits may be greater than $G \times k_{min}$). Here, the second subset of bits 430-*b* may include six (6) bits instead of eight (8) bits. Such techniques may minimize spectral efficiency loss when the described techniques are used, for example, but including as many of the original information bits 410 in the updated bits 440 as possible. Additionally, a receiving device may receive an indication of the quantity of bits included in the first subset of bits 430-*a* (e.g., the restricted bits) and the second subset of bits 430-*b*, as well as an indication of the techniques used by the wireless device when transmitting the signal. Such indications may help a receiving device decode and reconstruct the signal when received. In other example, such indications may be identified by the receiving device based on a predefined quantity of bits in the first subset of bits 430-*a*, predefined techniques used to select the quantity of bits in the first subset of bits 430-*a*, or the like.

With each group of the second set of bits 415-*b* having the same size, the bits may be processed in accordance with the PTS techniques described herein. That is, a set of candidate PTSs may be obtained through respective IFFTs outputs having phase rotations applied, which may then be summed and a candidate having a relatively lowest PAPR is selected for the transmission of the signal.

Figure 5:
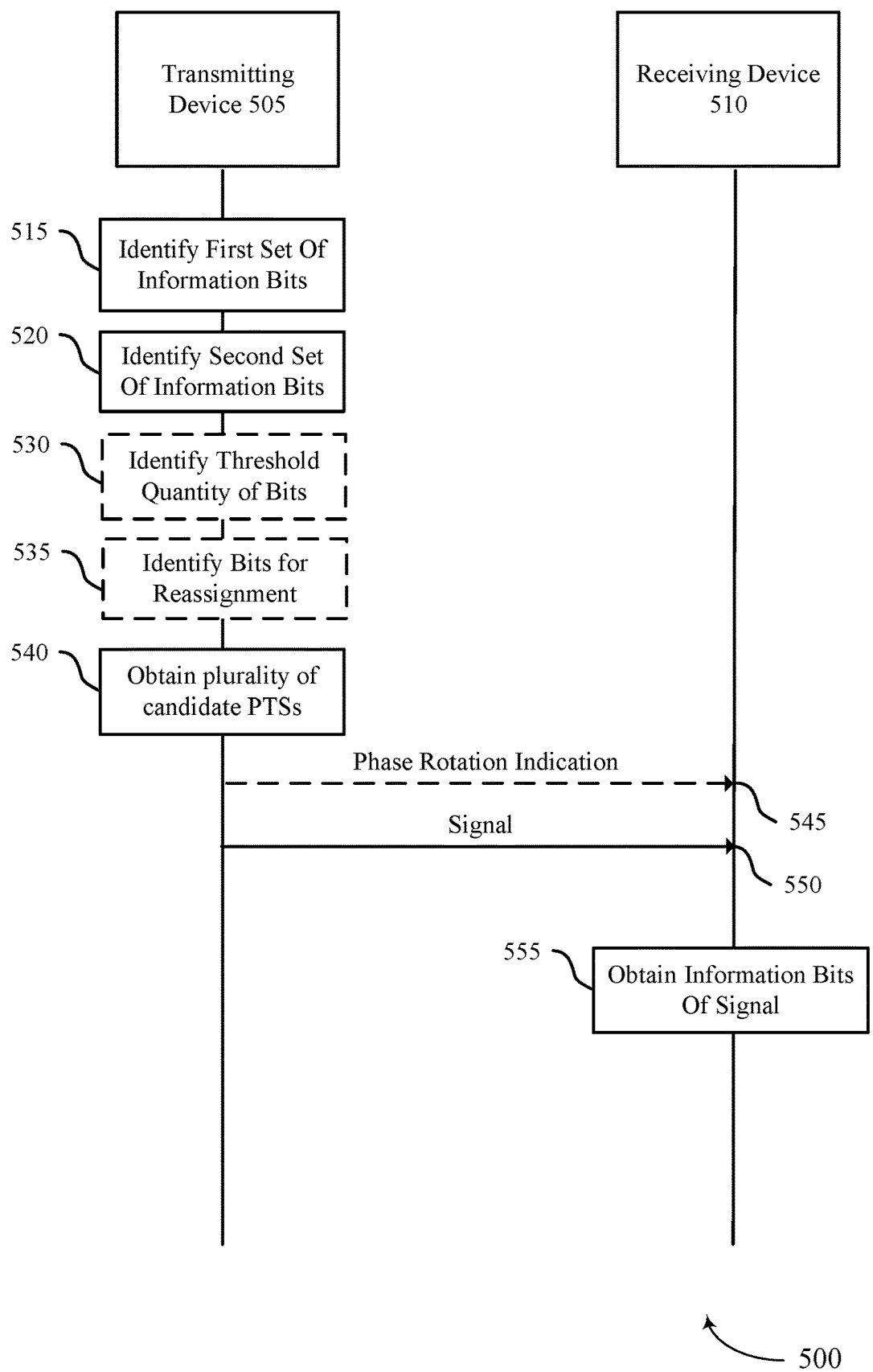
FIG. 5 illustrates an example of a process flow that supports techniques for PTS transmission using multi-mode IM in accordance with various aspects of the present disclosure.

FIG. 5 illustrates an example of a process flow that supports techniques for PTS transmission using multi-mode IM in accordance with various aspects of the present disclosure. The process flow 500 may implement aspects of the wireless communications system 100, the signal processing diagrams 200, and the wireless communications system 300 described with reference to FIGS. 1 through 3. The process flow 500 may also implement aspects of the signal processing diagrams 200 described with reference to FIG. 2. The process flow 500 may be based on communication between a transmitting device 505 and a receiving device 510, which may be examples of the transmitting device 305 and the receiving device 310, respectively, as described with reference to FIG. 3. The process flow 500 may be implemented by the transmitting device 505 and the receiving device 510 to improve spectral efficiency and lower a PAPR associated with the communication between the transmitting device 505 and the receiving device 510, among other benefits.

In the following description of the process flow 500, the operations between the transmitting device 505 and the receiving device 510 may be transmitted in a different order than the example order shown, or the operations performed by the transmitting device 505 and the receiving device 510 may be performed in different orders or at different times. Some operations may also be omitted from the process flow 500, and other operations may be added to the process flow 500.

At 515, the transmitting device 505 may identify a first set, or portion, of bits. For example, the transmitting device 505 may identify a first set of information bits of a signal. The first set of bits may indicate an index for a second set of bits of the information bits.

At 520, the transmitting device 505 may identify the second set of bits. For example, the transmitting device 505 may identify the second set of bits of the information bits of the signal. The transmitting device 505 may divide (e.g., partition) the second set of bits into one or more groups by modulating the second set of bits using multi-mode IM. In some cases, the transmitting device 505 may perform a PTS procedure, where modulation symbols are partitioned into multiple groups of the same size. Thus, the transmitting device 505 may ensure that the one or more groups have the same size.

At 530, the transmitting device 505 may identify a threshold quantity of bits. For example, the transmitting device 505 may identify the threshold quantity of bits for the one or more groups of bits for a time interval. If each of the one or more groups of bits fails to include at least the threshold quantity of bits, the one or more groups of bits may not have the same size. The threshold quantity of bits may be based on statistics of the information bits. Additionally, or alternatively, the threshold quantity of bits may be a minimum quantity of bits of a group of the one or more groups of bits. That is, the transmitting device 505 may compare the quantity of bits for each group and may set the threshold quantity of bits to the minimum quantity of bits for a group based on the results of the comparing.

In some cases, at 535, the transmitting device 505 may identify bits for reassignment. For example, the transmitting device 505 may identify bits for reassignment from a first group of bits to a second group of bits. The transmitting device 505 may identify which bits to reassign based on a difference between the original quantity of bits of the first group of bits and the original quantity of bits of the second group of bits, as described with reference to FIGS. 3 and 4A-4C. The transmitting device 505 may select which bits to reassign such that each of the one or more bits has the same size. For example, if a group has 8 bits and another group has 4 bits, and the threshold quantity of bits is 6, the transmitting device 505 may identify 2 bits from the group with 8 bits to reassign to the group with 4 bits, thus both groups have 6 bits.

At 540, the transmitting device 505 may obtain a plurality of candidate PTSs. For example, the transmitting device 505 may apply a PTS scheme using the groups obtained from the multi-mode IM. For instance, the transmitting device 505 may obtain the plurality of candidate PTSs based on a sum of phase-rotated IFFT outputs. More specifically, the transmitting device 505 may perform an IFFT for each group of the multi-mode IM, apply a phase rotation to the output of the IFFT, and add the phase-rotated IFFT outputs to obtain candidate PTSs.

At 545, the transmitting device 505 may transmit an indication 550 to the receiving device 510. For example, the indication 550 may indicate the phase rotation applied at 540 for each group of the one or more groups. The transmitting device 505 may select the candidate phase rotations, such as at random, and may transmit the phase rotation indication at 545.

At 550, the transmitting device 505 may transmit a signal 545 including the first set of bits and the second set of bits (e.g., the bit sequence or bit stream). For example, the transmitting device 505 may select a PTS from the candidate PTSs to transmit the signal 545. The transmitting device 505 may select the PTS from the candidate PTSs based on the PTS having a relatively lowest PAPR.

At 555, the receiving device 510 may combine the first set of bits and the second set of bits of the PTS to obtain information bits of a signal. For example, the receiving device 510 may use the phase rotations received at 545 to obtain the information bits of the signal.

Figure 6:
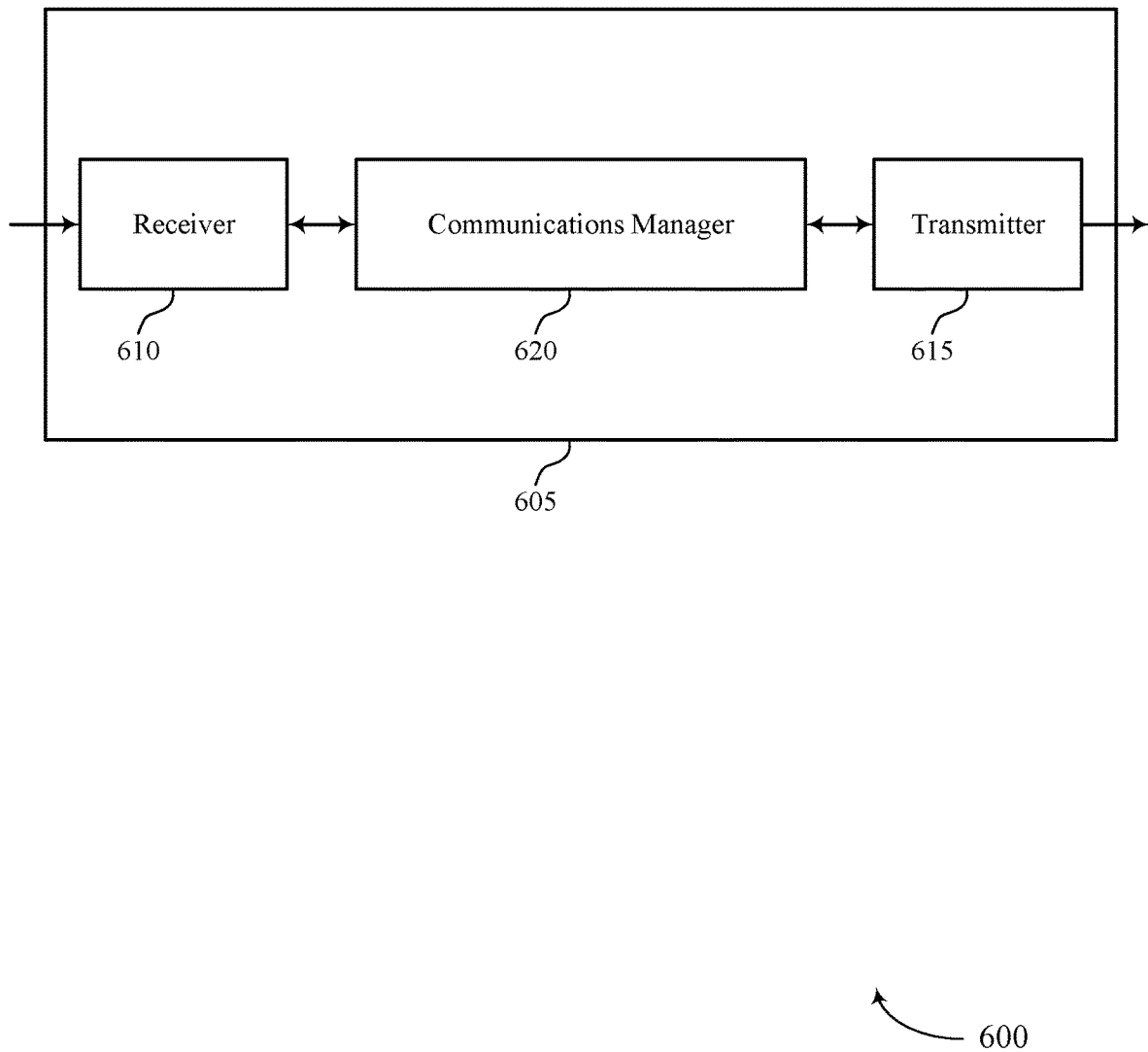
FIGS. 6 and 7 illustrate block diagrams of devices that support techniques for PTS transmission using multi-mode IM in accordance with various aspects of the present disclosure.

FIG. 6 illustrates a block diagram 600 of a device that support techniques for PTS transmission using multi-mode IM in accordance with various aspects of the present disclosure. The block diagram 600 may include a device 605, which may be an example of aspects of a transmitting device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for PTS transmission using multi-mode IM). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for PTS transmission using multi-mode IM). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of techniques for PTS transmission using multi-mode IM as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signaling processor (DSP), a central processing unit (CPU), an application-specific integrated circuit (ASIC), a field-programmable gate-array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a wireless device in accordance with examples as disclosed herein. For example, the communications manager 620 may be configured as or otherwise support a means for identifying a first set of multiple bits of information bits of a signal, the first set of multiple bits indicating an index associated with a second set of multiple bits of the information bits of the signal. The communications manager 620 may be configured as or otherwise support a means for identifying the second set of multiple bits, where the second set of multiple bits includes a first group of bits and a second group of bits. The communications manager 620 may be configured as or otherwise support a means for obtaining a set of multiple candidate PTSs based on a first phase rotation applied to a first output of an IFFT of the first group of bits and a second phase rotation applied to a second output of an IFFT of the second group of bits, the first group of bits and the second group of bits having a same size. The communications manager 620 may be configured as or otherwise support a means for transmitting the signal based on selecting a PTS from the set of multiple candidate PTSs.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for a transmitting wireless device (e.g., a UE or a network entity) to combine multi-mode IM with PTS to provide for reduced processing, reduced power consumption, more efficient utilization of communication resources, and the like.

Figure 7:
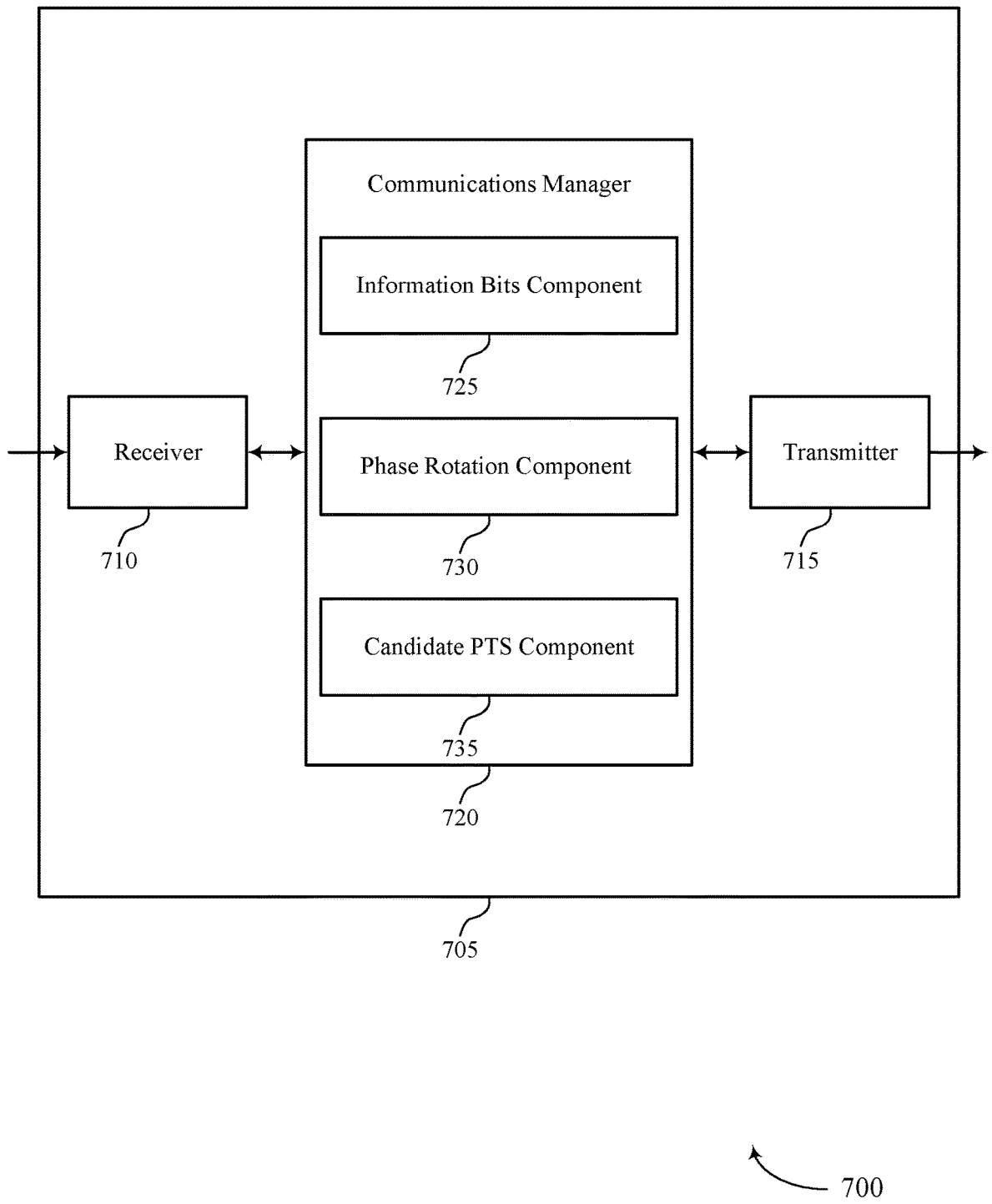

FIG. 7 illustrates a block diagram 700 of a device that support techniques for PTS transmission using multi-mode IM in accordance with various aspects of the present disclosure. The block diagram 700 may include a device 705, which may be an example of aspects of a device 605 (e.g., a transmitting device, such as a network entity 105 or a UE 115) as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for PTS transmission using multi-mode IM). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for PTS transmission using multi-mode IM). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of techniques for PTS transmission using multi-mode IM as described herein. For example, the communications manager 720 may include an information bits component 725, a phase rotation component 730, a candidate PTS component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a wireless device in accordance with examples as disclosed herein. The information bits component 725 may be configured as or otherwise support a means for identifying a first set of multiple bits of information bits of a signal, the first set of multiple bits indicating an index associated with a second set of multiple bits of the information bits of the signal. The information bits component 725 may be configured as or otherwise support a means for identifying the second set of multiple bits, where the second set of multiple bits includes a first group of bits and a second group of bits. The phase rotation component 730 may be configured as or otherwise support a means for obtaining a set of multiple candidate PTSs based on a first phase rotation applied to a first output of an IFFT of the first group of bits and a second phase rotation applied to a second output of an IFFT of the second group of bits, the first group of bits and the second group of bits having a same size. The candidate PTS component 735 may be configured as or otherwise support a means for transmitting the signal based on selecting a PTS from the set of multiple candidate PTSs.

Figure 8:
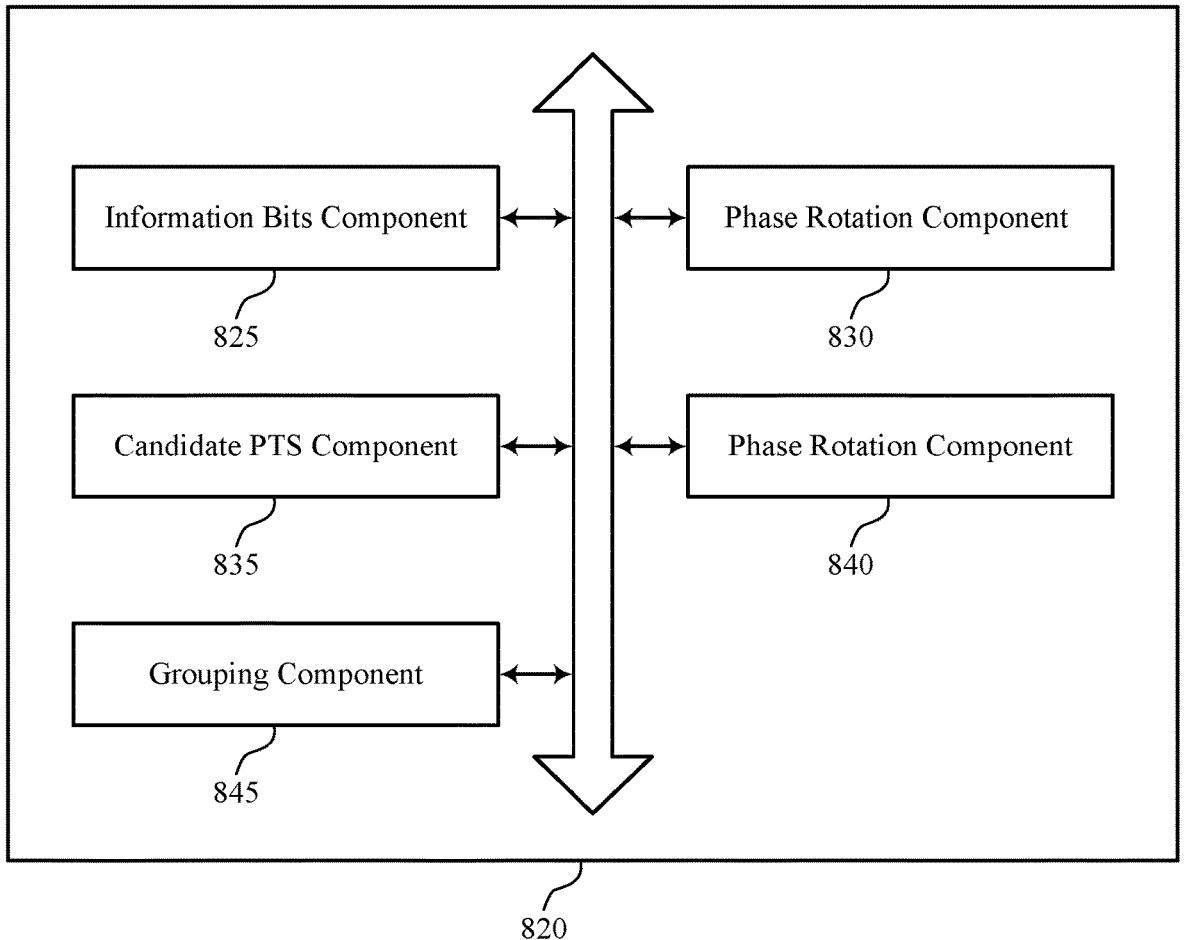
FIG. 8 illustrates a block diagram of a communications manager that supports techniques for PTS transmission using multi-mode IM in accordance with various aspects of the present disclosure.

FIG. 8 illustrates a block diagram 800 of a communications manager that supports techniques for PTS transmission using multi-mode IM in accordance with various aspects of the present disclosure. The block diagram 700 may include a communications manager 820, which may be an example of aspects of a communications manager 620, a communications manager 720, or both, as described herein. The communications manager 820, or various components thereof, may be an example of means for performing various aspects of techniques for PTS transmission using multi-mode IM as described herein. For example, the communications manager 820 may include an information bits component 825, a phase rotation component 830, a candidate PTS component 835, a phase rotation component 840, a grouping component 845, or any combination thereof. Each of these components may communicate, directly or indirectly, with one another (e.g., via one or more buses).

The communications manager 820 may support wireless communication at a wireless device in accordance with examples as disclosed herein. The information bits component 825 may be configured as or otherwise support a means for identifying a first set of multiple bits of information bits of a signal, the first set of multiple bits indicating an index associated with a second set of multiple bits of the information bits of the signal. In some examples, the information bits component 825 may be configured as or otherwise support a means for identifying the second set of multiple bits, where the second set of multiple bits includes a first group of bits and a second group of bits. The phase rotation component 830 may be configured as or otherwise support a means for obtaining a set of multiple candidate PTSs based on a first phase rotation applied to a first output of an IFFT of the first group of bits and a second phase rotation applied to a second output of an IFFT of the second group of bits, the first group of bits and the second group of bits having a same size. The candidate PTS component 835 may be configured as or otherwise support a means for transmitting the signal based on selecting a PTS from the set of multiple candidate PTSs.

In some examples, the phase rotation component 840 may be configured as or otherwise support a means for transmitting an indication of the first phase rotation and the second phase rotation based on selecting the first phase rotation for the first group of bits and the second phase rotation for the second group of bits.

In some examples, the grouping component 845 may be configured as or otherwise support a means for identifying, for a time interval, a threshold quantity of bits for the first group of bits and the second group of bits, where the first group of bits and the second group of bits have the same size based on the first group of bits including at least the threshold quantity of bits during the time interval and the second group of bits including at least the threshold quantity of bits during the time interval.

In some examples, the threshold quantity of bits is based on one or more statistics associated with the information bits.

In some examples, the threshold quantity of bits corresponds to a minimum quantity of bits of either the first group of bits or the second group of bits.

In some examples, the grouping component 845 may be configured as or otherwise support a means for determining a first quantity of bits for a first subset of bits of the first set of multiple bits, the first quantity of bits being based on a product of the threshold quantity of bits and a quantity of groups associated with the second set of multiple bits.

In some examples, the grouping component 845 may be configured as or otherwise support a means for determining a second quantity of bits for a second subset of bits of the first set of multiple bits, the second quantity of bits including a difference between a total quantity of bits of the first set of multiple bits and the first quantity of bits of the first subset of bits, where the first set of multiple bits includes the first subset of bits and the second subset of bits. In some examples, the grouping component 845 may be configured as or otherwise support a means for selecting values for the second subset of bits for indicating the index associated with the second set of multiple bits, where the first group of bits and the second group of bits have the same size based on the selected values.

In some examples, the grouping component 845 may be configured as or otherwise support a means for identifying one or more bits for reassignment from the first group of bits to the second group of bits, the one or more bits being identified based on a difference between a first original quantity of bits of the first group of bits and a second original quantity of bits of the second group of bits, where the first original quantity of bits is different than the second original quantity of bits. In some examples, the grouping component 845 may be configured as or otherwise support a means for determining the values for the second subset of bits based on the identified one or more bits for reassignment.

In some examples, the grouping component 845 may be configured as or otherwise support a means for determining the values for the second subset of bits based on randomly selecting a portion of bits from the first group of bits for reassignment to the second group of bits.

In some examples, the second subset of bits includes one or more dummy bits.

In some examples, the first quantity of bits for the first subset of bits further includes one or more bits from a second subset of bits of the first set of multiple bits. In some examples, the one or more bits include bits that are located after a bit of the second subset of bits that has a modified value.

In some examples, the grouping component 845 may be configured as or otherwise support a means for transmitting an indication of the quantity of bits for the first subset of bits.

In some examples, to support obtaining the set of multiple candidate PTSs, the candidate PTS component 835 may be configured as or otherwise support a means for obtaining a sum of the first output and the second output. In some examples, to support obtaining the set of multiple candidate PTSs, the candidate PTS component 835 may be configured as or otherwise support a means for generating the set of multiple candidate PTSs in accordance with the obtained sum.

In some examples, the candidate PTS component 835 may be configured as or otherwise support a means for selecting the PTS from the set of multiple candidate PTSs based on comparing respective PAPRs for the set of multiple candidate PTSs, where the selected PTS is associated with a lowest PAPR of the respective PAPRs.

In some examples, the first group of bits are orthogonal to the second group of bits based on one or more modulation schemes.

Figure 9:
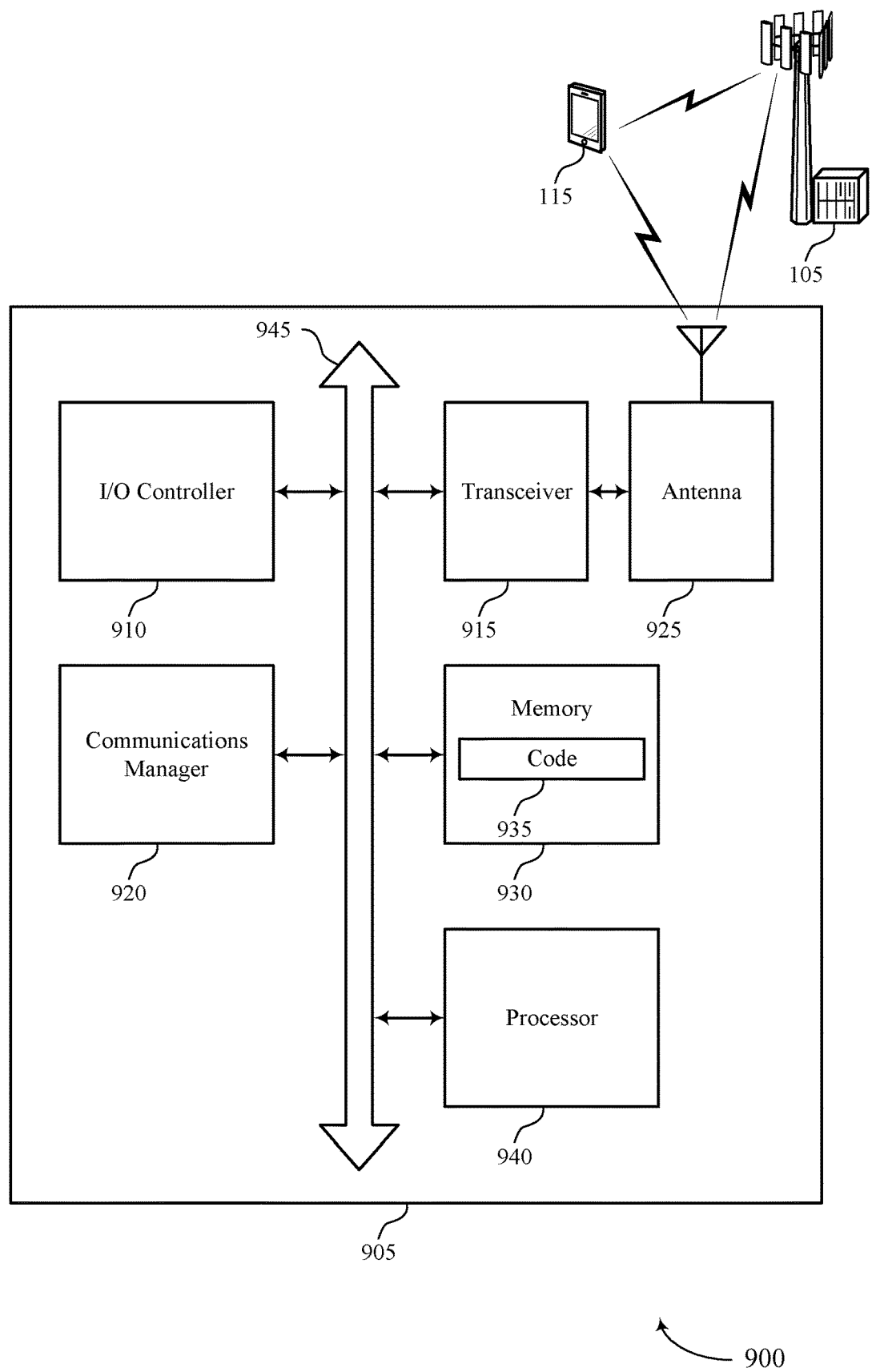
FIG. 9 illustrates a diagram of a system including a device that supports techniques for PTS transmission using multi-mode IM in accordance with various aspects of the present disclosure.

FIG. 9 illustrates a diagram 900 of a system including a device that supports techniques for PTS transmission using multi-mode IM in accordance with various aspects of the present disclosure. The diagram 900 may include a device 905, which may be an example of or include the components of a device 605, a device 705, or a transmitting device as described herein. The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for PTS transmission using multi-mode IM). For example, the device 905 or a component of the device 905 may include a processor 940 and memory 930 coupled with or to the processor 940, the processor 940 and memory 930 configured to perform various functions described herein.

The communications manager 920 may support wireless communication at a wireless device in accordance with examples as disclosed herein. For example, the communications manager 920 may be configured as or otherwise support a means for identifying a first set of multiple bits of information bits of a signal, the first set of multiple bits indicating an index associated with a second set of multiple bits of the information bits of the signal. The communications manager 920 may be configured as or otherwise support a means for identifying the second set of multiple bits, where the second set of multiple bits includes a first group of bits and a second group of bits. The communications manager 920 may be configured as or otherwise support a means for obtaining a set of multiple candidate PTSs based on a first phase rotation applied to a first output of an IFFT of the first group of bits and a second phase rotation applied to a second output of an IFFT of the second group of bits, the first group of bits and the second group of bits having a same size. The communications manager 920 may be configured as or otherwise support a means for transmitting the signal based on selecting a PTS from the set of multiple candidate PTSs.

By including or configuring the communications manager 920 in accordance with examples as described herein, the device 905 may support techniques for a transmitting wireless device (e.g., a UE or a network entity) to combine multi-mode IM with PTS to provide for improved communication reliability, reduced latency, improved user experience related to reduced processing, reduced power consumption, more efficient utilization of communication resources, improved coordination between devices, longer battery life, improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for PTS transmission using multi-mode IM as described herein, or the processor 940 and the memory 930 may be otherwise configured to perform or support such operations.

Figure 10:
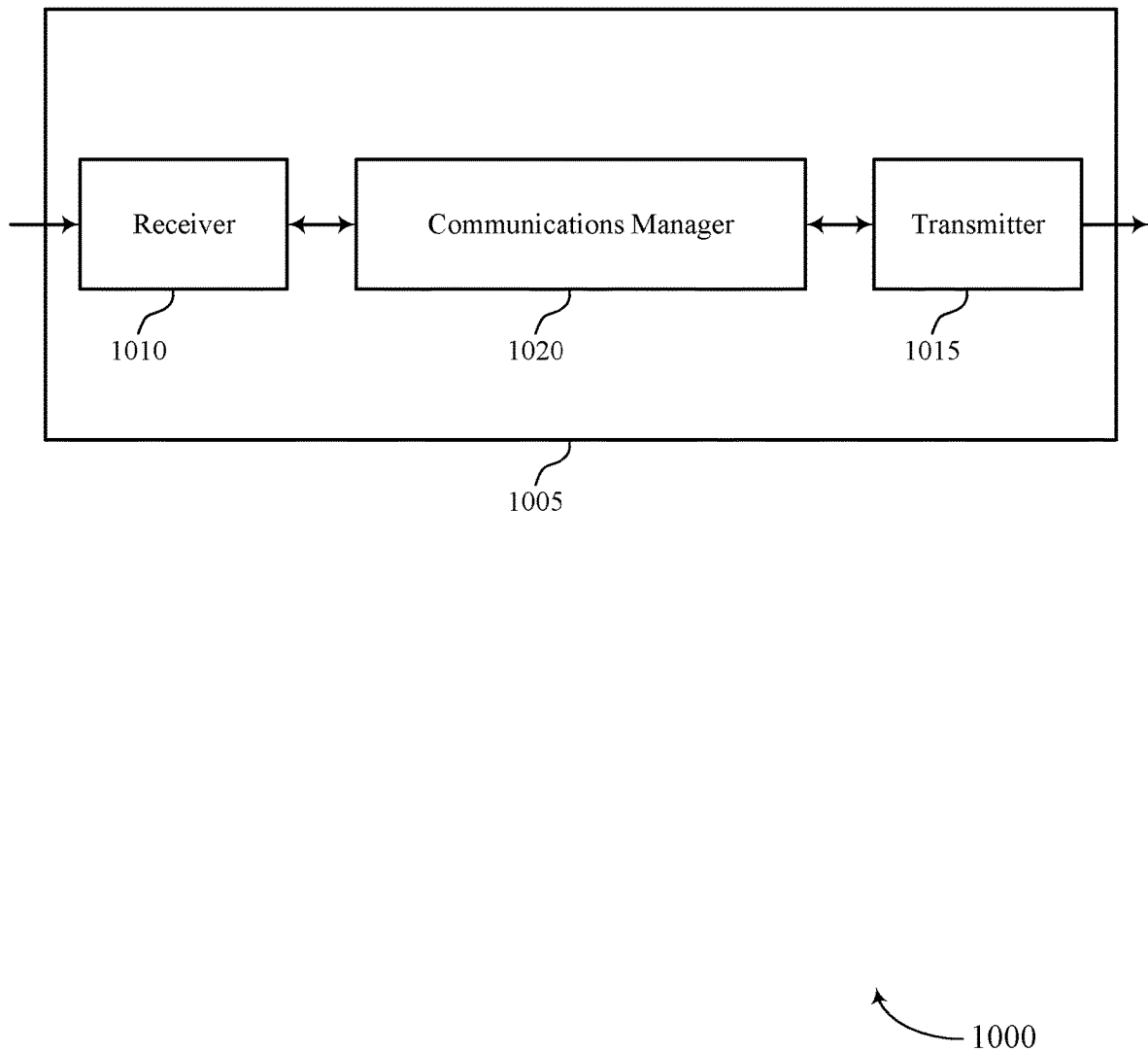
FIGS. 10 and 11 illustrate block diagrams of devices that support techniques for PTS transmission using multi-mode IM in accordance with various aspects of the present disclosure.

FIG. 10 illustrates a block diagram 1000 of a device that support techniques for PTS transmission using multi-mode IM in accordance with various aspects of the present disclosure. The block diagram 1000 may include a device 1005, which may be an example of aspects of a receiving device as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for PTS transmission using multi-mode IM as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. For example, the communications manager 1020 may be configured as or otherwise support a means for receiving a first set of multiple bits and a second set of multiple bits in accordance with a PTS, the first set of multiple bits indicating an index associated with the second set of multiple bits in at least one subcarrier, and the second set of multiple bits including a first group of bits and a second group of bits. The communications manager 1020 may be configured as or otherwise support a means for combining the first set of multiple bits and the second set of multiple bits based on the PTS to obtain information bits of a signal.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for a transmitting wireless device (e.g., a UE or a network entity) to combine multi-mode IM with PTS to provide for reduced processing, reduced power consumption, more efficient utilization of communication resources, and the like.

Figure 11:
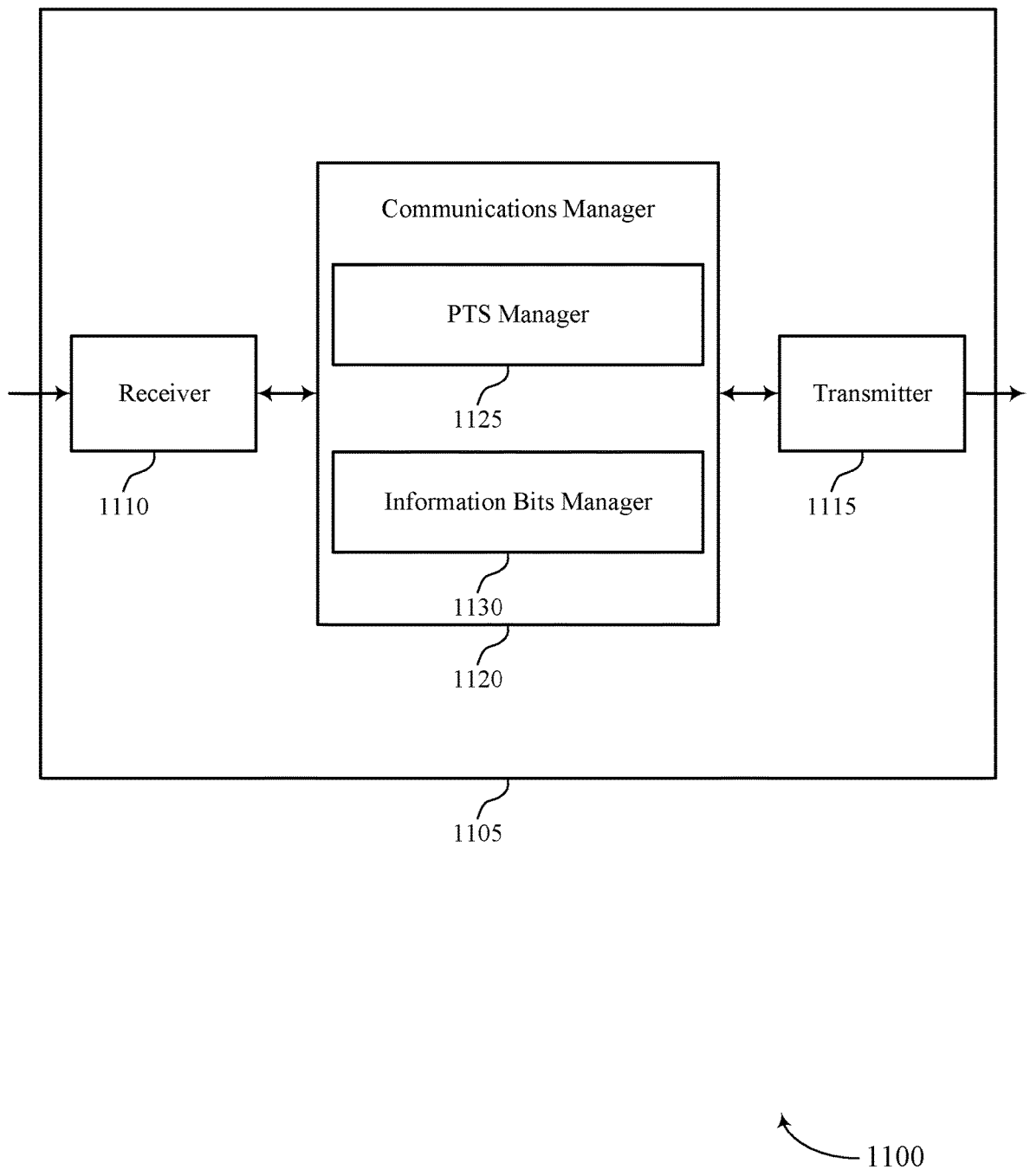

FIG. 11 illustrates a block diagram 1100 of a device that support techniques for PTS transmission using multi-mode IM in accordance with various aspects of the present disclosure. The block diagram 1100 may include a device 1105, which may be an example of aspects of a device 1005 (e.g., a receiving device, such as a network entity 105 or a UE 115, as described herein). The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for PTS transmission using multi-mode IM as described herein. For example, the communications manager 1120 may include a PTS manager 1125 an information bits manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. The PTS manager 1125 may be configured as or otherwise support a means for receiving a first set of multiple bits and a second set of multiple bits in accordance with a PTS, the first set of multiple bits indicating an index associated with the second set of multiple bits in at least one subcarrier, and the second set of multiple bits including a first group of bits and a second group of bits. The information bits manager 1130 may be configured as or otherwise support a means for combining the first set of multiple bits and the second set of multiple bits based on the PTS to obtain information bits of a signal.

Figure 12:
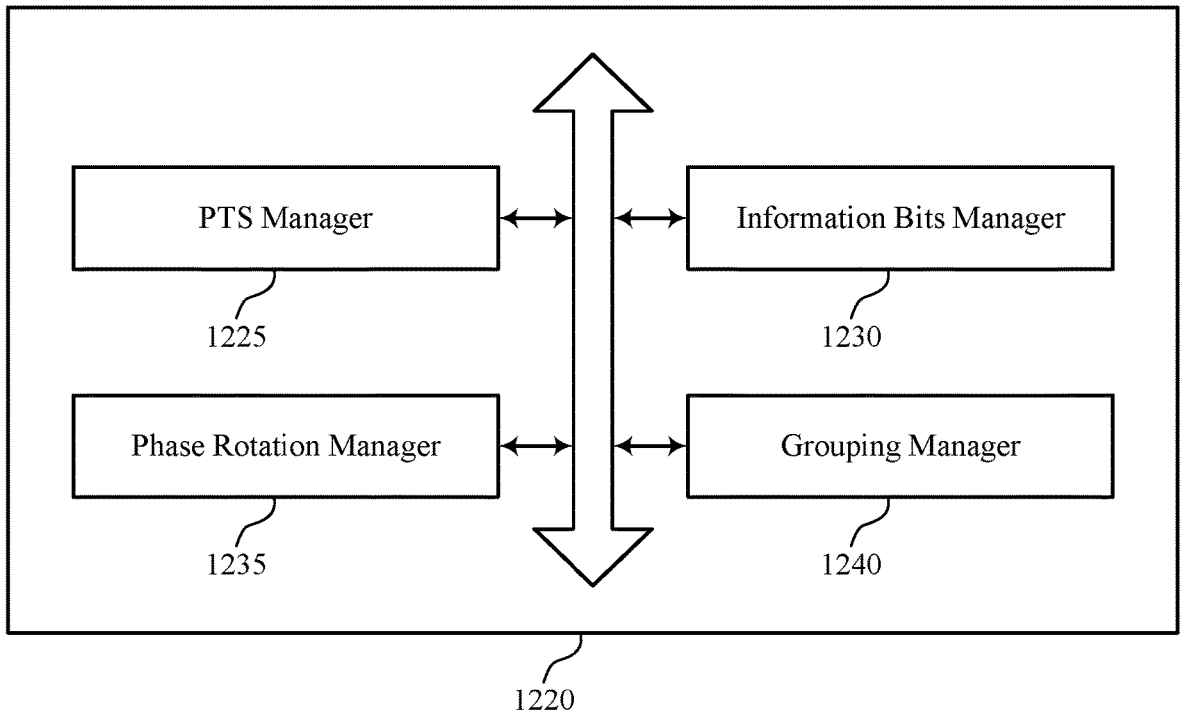
FIG. 12 illustrates a block diagram of a communications manager that supports techniques for PTS transmission using multi-mode IM in accordance with various aspects of the present disclosure.

FIG. 12 illustrates a block diagram of a communications manager that supports techniques for PTS transmission using multi-mode IM in accordance with various aspects of the present disclosure. The block diagram 1200 may include a communications manager 1220, which may be an example of aspects of a communications manager 1020, a communications manager 1120, or both, as described herein. The communications manager 1220, or various components thereof, may be an example of means for performing various aspects of techniques for PTS transmission using multi-mode IM as described herein. For example, the communications manager 1220 may include a PTS manager 1225, an information bits manager 1230, a phase rotation manager 1235, a grouping manager 1240, or any combination thereof. Each of these components may communicate, directly or indirectly, with one another (e.g., via one or more buses).

The communications manager 1220 may support wireless communication in accordance with examples as disclosed herein. The PTS manager 1225 may be configured as or otherwise support a means for receiving a first set of multiple bits and a second set of multiple bits in accordance with a PTS, the first set of multiple bits indicating an index associated with the second set of multiple bits in at least one subcarrier, and the second set of multiple bits including a first group of bits and a second group of bits. The information bits manager 1230 may be configured as or otherwise support a means for combining the first set of multiple bits and the second set of multiple bits based on the PTS to obtain information bits of a signal.

In some examples, the phase rotation manager 1235 may be configured as or otherwise support a means for receiving an indication of a first phase rotations for the first group of bits and a second phase rotation for the second group of bits.

In some examples, the grouping manager 1240 may be configured as or otherwise support a means for receiving an indication of a quantity of bits for a first subset of bits of the first set of multiple bits.

In some examples, the first group of bits are orthogonal to the second group of bits based on one or more modulation schemes.

Figure 13:
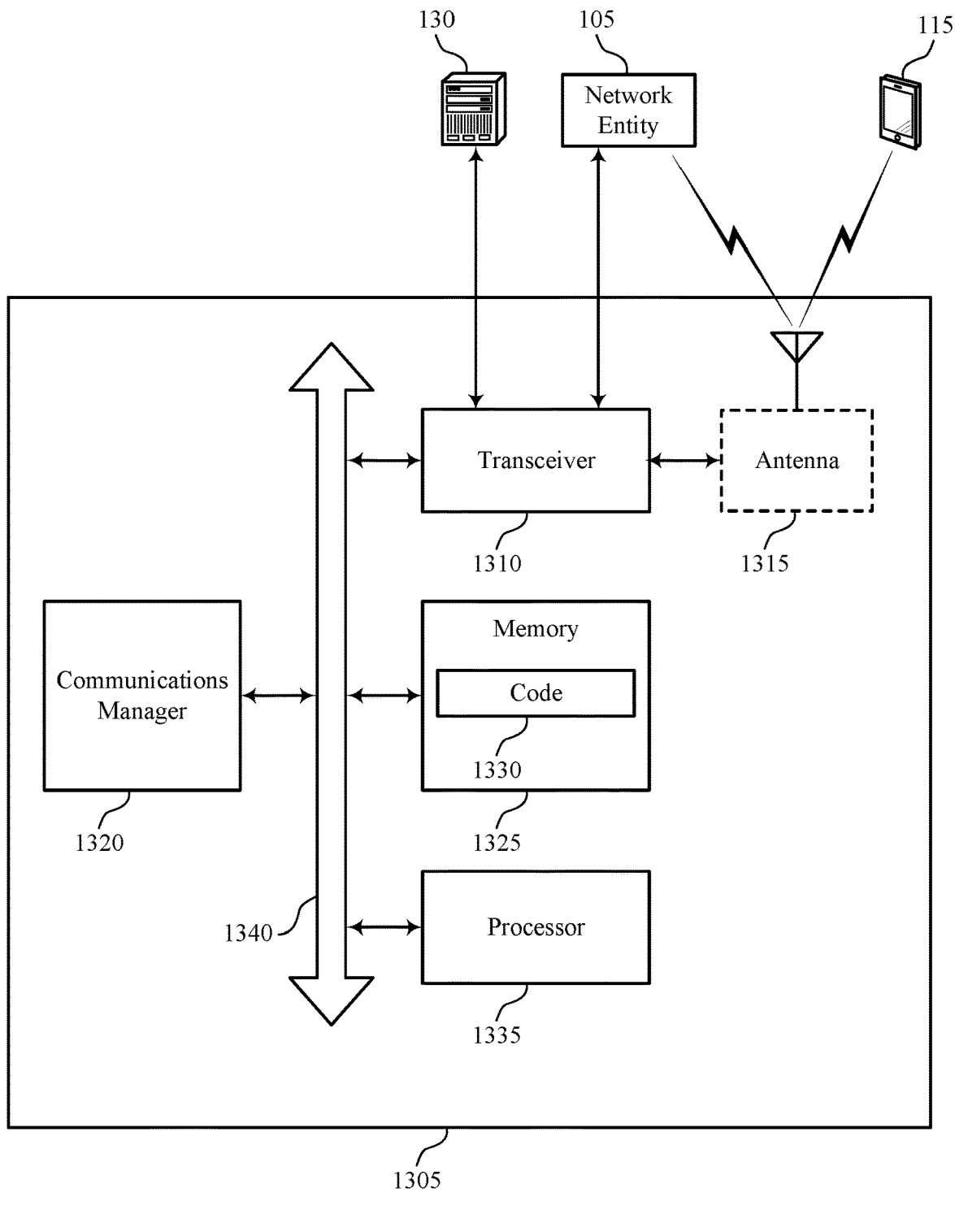
FIG. 13 illustrates a diagram of a system including a device that supports techniques for PTS transmission using multi-mode IM in accordance with various aspects of the present disclosure.

FIG. 13 illustrates a diagram 1300 of a system including a device that supports techniques for PTS transmission using multi-mode IM in accordance with various aspects of the present disclosure. The diagram 1300 may include a device 1305, which may be an example of or include the components of a device 1005, a device 1105, or a receiving device as described herein. The device 1305 may include components for bi-directional voice and data communications including components for transmitting and receiving communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for PTS transmission using multi-mode IM). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may, for example, refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system.

A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication in accordance with examples as disclosed herein. For example, the communications manager 1320 may be configured as or otherwise support a means for receiving a first set of multiple bits and a second set of multiple bits in accordance with a PTS, the first set of multiple bits indicating an index associated with the second set of multiple bits in at least one subcarrier, and the second set of multiple bits including a first group of bits and a second group of bits. The communications manager 1320 may be configured as or otherwise support a means for combining the first set of multiple bits and the second set of multiple bits based on the PTS to obtain information bits of a signal.

By including or configuring the communications manager 1320 in accordance with examples as described herein, the device 1305 may support techniques for a transmitting wireless device (e.g., a UE or a network entity) to combine multi-mode IM with PTS to provide for improved communication reliability, reduced latency, improved user experience related to reduced processing, reduced power consumption, more efficient utilization of communication resources, improved coordination between devices, longer battery life, improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for PTS transmission using multi-mode IM as described herein, or the processor 1335 and the memory 1325 may be otherwise configured to perform or support such operations.

Figure 14:
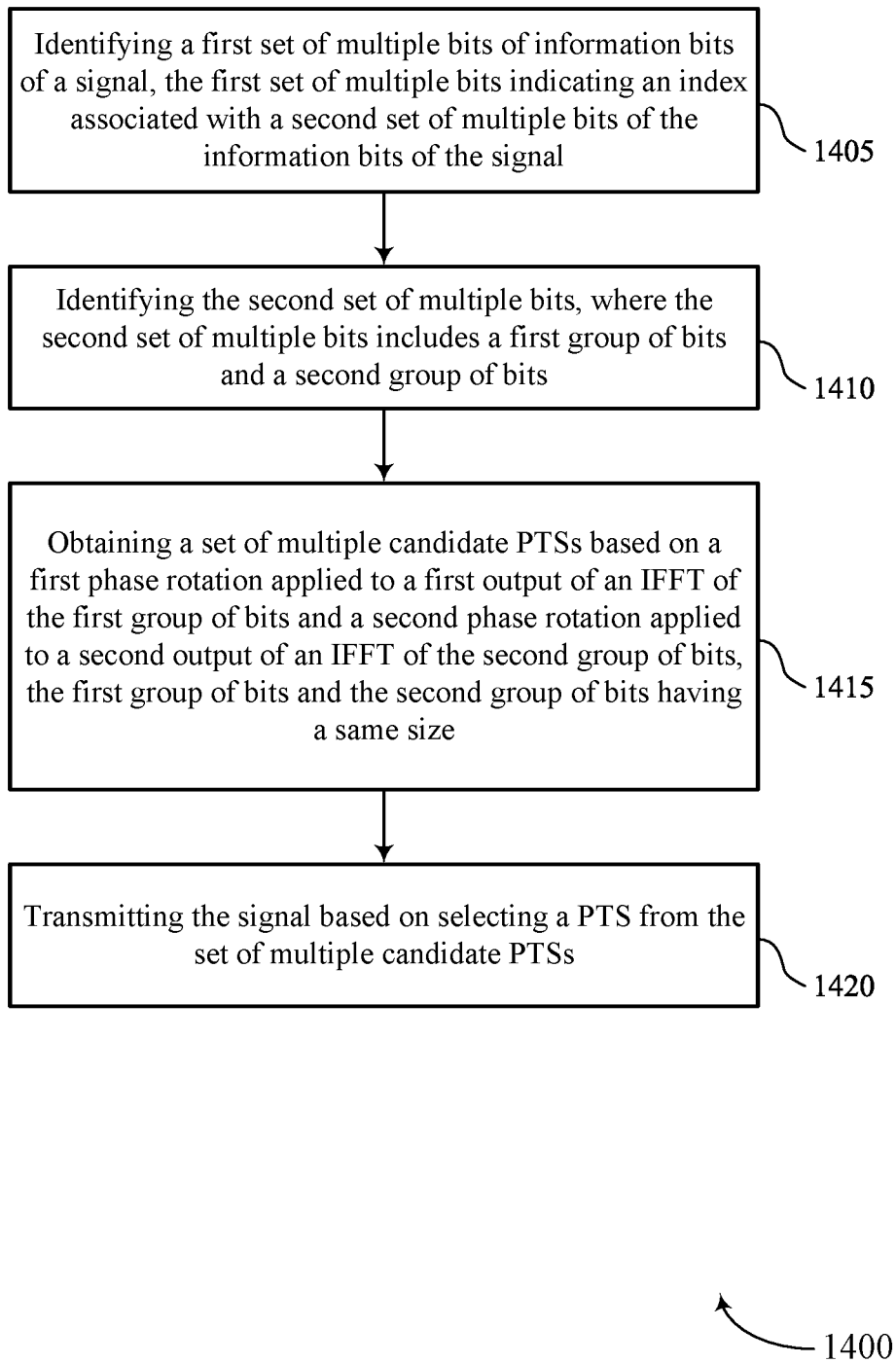
FIGS. 14 through 17 illustrate flowcharts showing methods that support techniques for PTS transmission using multi-mode IM in accordance with various aspects of the present disclosure.

FIG. 14 illustrates a flowchart showing methods that support techniques for PTS transmission using multi-mode IM in accordance with various aspects of the present disclosure. The operations of the method 1400 may be implemented by a transmitting device or its components as described herein. For example, the operations of the method 1400 may be performed by a transmitting device as described with reference to FIGS. 1 through 9. In some examples, a transmitting device may execute a set of instructions to control the functional elements of the transmitting device to perform the described functions. Additionally, or alternatively, the transmitting device may perform aspects of the described functions using special-purpose hardware.

At 1405, the method may include identifying a first set of multiple bits of information bits of a signal, the first set of multiple bits indicating an index associated with a second set of multiple bits of the information bits of the signal. The operations of 1405 may be performed in accordance with examples as disclosed herein. In some examples, aspects of the operations of 1405 may be performed by an information bits component 825 as described with reference to FIG. 8.

At 1410, the method may include identifying the second set of multiple bits, where the second set of multiple bits includes a first group of bits and a second group of bits. The operations of 1410 may be performed in accordance with examples as disclosed herein. In some examples, aspects of the operations of 1410 may be performed by an information bits component 825 as described with reference to FIG. 8.

At 1415, the method may include obtaining a set of multiple candidate PTSs based on a first phase rotation applied to a first output of an IFFT of the first group of bits and a second phase rotation applied to a second output of an IFFT of the second group of bits, the first group of bits and the second group of bits having a same size. The operations of 1415 may be performed in accordance with examples as disclosed herein. In some examples, aspects of the operations of 1415 may be performed by a phase rotation component 830 as described with reference to FIG. 8.

At 1420, the method may include transmitting the signal based on selecting a PTS from the set of multiple candidate PTSs. The operations of 1420 may be performed in accordance with examples as disclosed herein. In some examples, aspects of the operations of 1420 may be performed by a candidate PTS component 835 as described with reference to FIG. 8.

Figure 15:
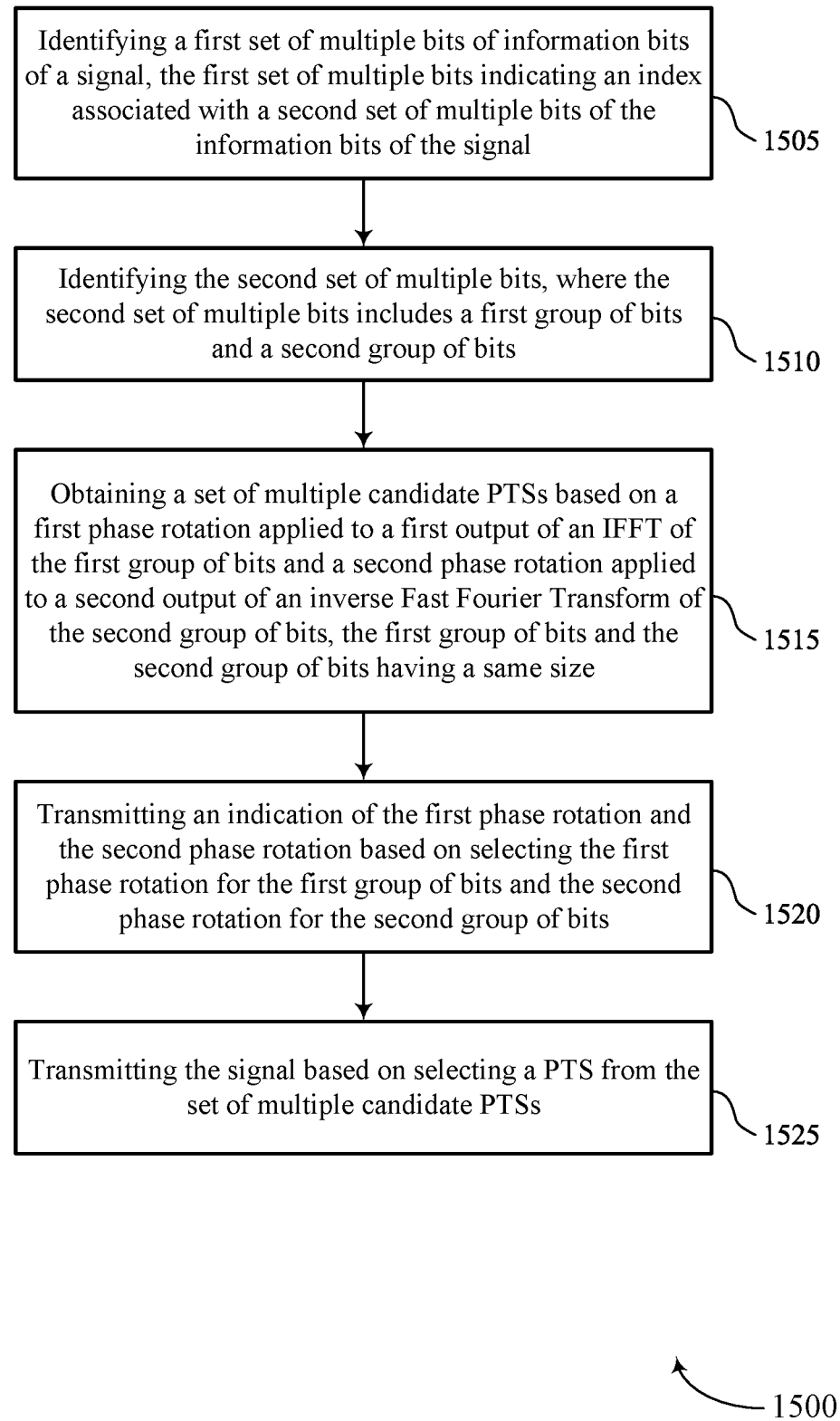

FIG. 15 illustrates a flowchart showing methods that support techniques for PTS transmission using multi-mode IM in accordance with various aspects of the present disclosure. The operations of the method 1500 may be implemented by a transmitting device or its components as described herein. For example, the operations of the method 1500 may be performed by a transmitting device as described with reference to FIGS. 1 through 9. In some examples, a transmitting device may execute a set of instructions to control the functional elements of the transmitting device to perform the described functions. Additionally, or alternatively, the transmitting device may perform aspects of the described functions using special-purpose hardware.

At 1505, the method may include identifying a first set of multiple bits of information bits of a signal, the first set of multiple bits indicating an index associated with a second set of multiple bits of the information bits of the signal. The operations of 1505 may be performed in accordance with examples as disclosed herein. In some examples, aspects of the operations of 1505 may be performed by an information bits component 825 as described with reference to FIG. 8.

At 1510, the method may include identifying the second set of multiple bits, where the second set of multiple bits includes a first group of bits and a second group of bits. The operations of 1510 may be performed in accordance with examples as disclosed herein. In some examples, aspects of the operations of 1510 may be performed by an information bits component 825 as described with reference to FIG. 8.

At 1515, the method may include obtaining a set of multiple candidate PTSs based on a first phase rotation applied to a first output of an IFFT of the first group of bits and a second phase rotation applied to a second output of an IFFT of the second group of bits, the first group of bits and the second group of bits having a same size. The operations of 1515 may be performed in accordance with examples as disclosed herein. In some examples, aspects of the operations of 1515 may be performed by a phase rotation component 830 as described with reference to FIG. 8.

At 1520, the method may include transmitting an indication of the first phase rotation and the second phase rotation based on selecting the first phase rotation for the first group of bits and the second phase rotation for the second group of bits. The operations of 1520 may be performed in accordance with examples as disclosed herein. In some examples, aspects of the operations of 1520 may be performed by a phase rotation component 840 as described with reference to FIG. 8.

At 1525, the method may include transmitting the signal based on selecting a PTS from the set of multiple candidate PTSs. The operations of 1525 may be performed in accordance with examples as disclosed herein. In some examples, aspects of the operations of 1525 may be performed by a candidate PTS component 835 as described with reference to FIG. 8.

Figure 16:
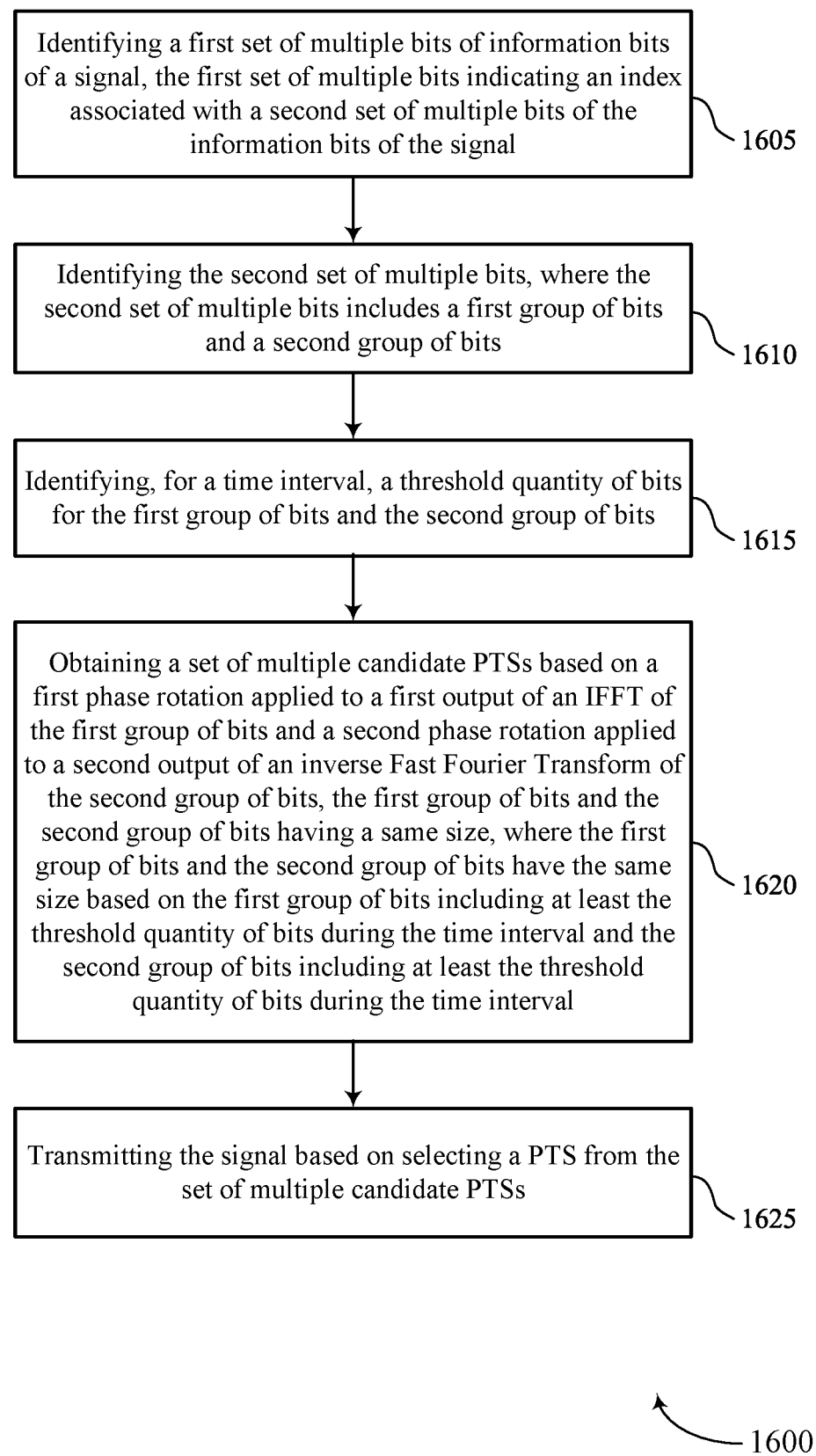

FIG. 16 illustrates a flowchart showing methods that support techniques for PTS transmission using multi-mode IM in accordance with various aspects of the present disclosure. The operations of the method 1600 may be implemented by a transmitting device or its components as described herein. For example, the operations of the method 1600 may be performed by a transmitting device as described with reference to FIGS. 1 through 9. In some examples, a transmitting device may execute a set of instructions to control the functional elements of the transmitting device to perform the described functions. Additionally, or alternatively, the transmitting device may perform aspects of the described functions using special-purpose hardware.

At 1605, the method may include identifying a first set of multiple bits of information bits of a signal, the first set of multiple bits indicating an index associated with a second set of multiple bits of the information bits of the signal. The operations of 1605 may be performed in accordance with examples as disclosed herein. In some examples, aspects of the operations of 1605 may be performed by an information bits component 825 as described with reference to FIG. 8.

At 1610, the method may include identifying the second set of multiple bits, where the second set of multiple bits includes a first group of bits and a second group of bits. The operations of 1610 may be performed in accordance with examples as disclosed herein. In some examples, aspects of the operations of 1610 may be performed by an information bits component 825 as described with reference to FIG. 8.

At 1615, the method may include identifying, for a time interval, a threshold quantity of bits for the first group of bits and the second group of bits. The operations of 1615 may be performed in accordance with examples as disclosed herein. In some examples, aspects of the operations of 1615 may be performed by a grouping component 845 as described with reference to FIG. 8.

At 1620, the method may include obtaining a set of multiple candidate PTSs based on a first phase rotation applied to a first output of an IFFT of the first group of bits and a second phase rotation applied to a second output of an IFFT of the second group of bits, the first group of bits and the second group of bits having a same size, where the first group of bits and the second group of bits have the same size based on the first group of bits including at least the threshold quantity of bits during the time interval and the second group of bits including at least the threshold quantity of bits during the time interval. The operations of 1620 may be performed in accordance with examples as disclosed herein. In some examples, aspects of the operations of 1620 may be performed by a phase rotation component 830 as described with reference to FIG. 8.

At 1625, the method may include transmitting the signal based on selecting a PTS from the set of multiple candidate PTSs. The operations of 1625 may be performed in accordance with examples as disclosed herein. In some examples, aspects of the operations of 1625 may be performed by a candidate PTS component 835 as described with reference to FIG. 8.

Figure 17:
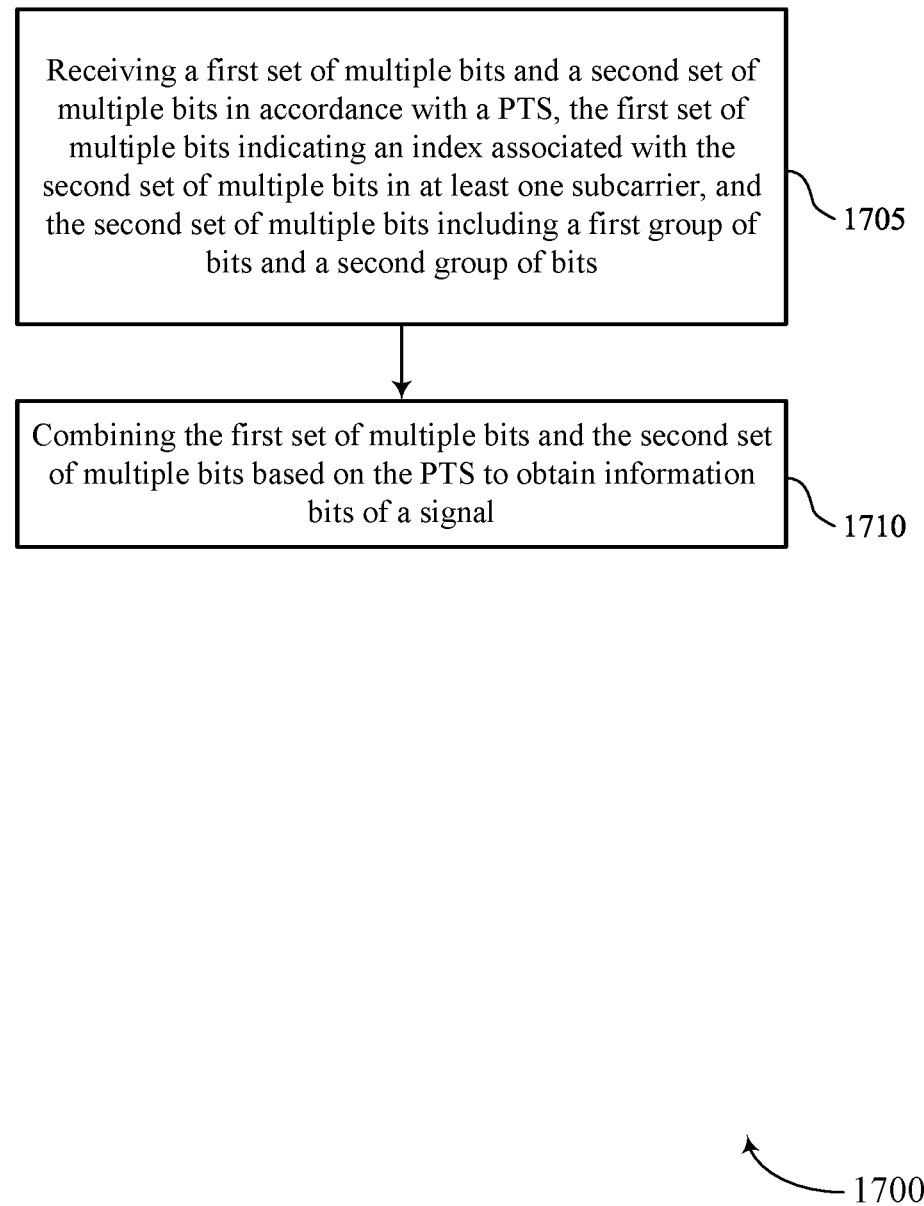

FIG. 17 illustrates a flowchart showing methods that support techniques for PTS transmission using multi-mode IM in accordance with various aspects of the present disclosure. The operations of the method 1700 may be implemented by a receiving device or its components as described herein. For example, the operations of the method 1700 may be performed by a receiving device as described with reference to FIGS. 1 through 5 and 10 through 13. In some examples, a receiving device may execute a set of instructions to control the functional elements of the receiving device to perform the described functions. Additionally, or alternatively, the receiving device may perform aspects of the described functions using special-purpose hardware.

At 1705, the method may include receiving a first set of multiple bits and a second set of multiple bits in accordance with a PTS, the first set of multiple bits indicating an index associated with the second set of multiple bits in at least one subcarrier, and the second set of multiple bits including a first group of bits and a second group of bits. The operations of 1705 may be performed in accordance with examples as disclosed herein. In some examples, aspects of the operations of 1705 may be performed by a PTS manager 1225 as described with reference to FIG. 12.

At 1710, the method may include combining the first set of multiple bits and the second set of multiple bits based on the PTS to obtain information bits of a signal. The operations of 1710 may be performed in accordance with examples as disclosed herein. In some examples, aspects of the operations of 1710 may be performed by an information bits manager 1230 as described with reference to FIG. 12.

The following provides an overview of aspects of the present disclosure:

Aspect 1: A method for wireless communication at a wireless device, comprising: identifying a first plurality of bits of information bits of a signal, the first plurality of bits indicating an index associated with a second plurality of bits of the information bits of the signal; identifying the second plurality of bits, wherein the second plurality of bits includes a first group of bits and a second group of bits; obtaining a plurality of candidate partial transmit sequences based at least in part on a first phase rotation applied to a first output of an inverse Fast Fourier Transform of the first group of bits and a second phase rotation applied to a second output of an inverse Fast Fourier Transform of the second group of bits, the first group of bits and the second group of bits having a same size; and transmitting the signal based at least in part on selecting a partial transmit sequence from the plurality of candidate partial transmit sequences.

Aspect 2: The method of aspect 1, further comprising: transmitting an indication of the first phase rotation and the second phase rotation based at least in part on selecting the first phase rotation for the first group of bits and the second phase rotation for the second group of bits.

Aspect 3: The method of any of aspects 1 through 2, further comprising: identifying, for a time interval, a threshold quantity of bits for the first group of bits and the second group of bits, wherein the first group of bits and the second group of bits have the same size based at least in part on the first group of bits including at least the threshold quantity of bits during the time interval and the second group of bits including at least the threshold quantity of bits during the time interval.

Aspect 4: The method of aspect 3, wherein the threshold quantity of bits is based at least in part on one or more statistics associated with the information bits.

Aspect 5: The method of any of aspects 3 through 4, wherein the threshold quantity of bits corresponds to a minimum quantity of bits of either the first group of bits or the second group of bits.

Aspect 6: The method of any of aspects 3 through 5, further comprising: determining a first quantity of bits for a first subset of bits of the first plurality of bits, the first quantity of bits being based at least in part on a product of the threshold quantity of bits and a quantity of groups associated with the second plurality of bits.

Aspect 7: The method of aspect 6, further comprising: determining a second quantity of bits for a second subset of bits of the first plurality of bits, the second quantity of bits comprising a difference between a total quantity of bits of the first plurality of bits and the first quantity of bits of the first subset of bits, wherein the first plurality of bits includes the first subset of bits and the second subset of bits; and selecting values for the second subset of bits for indicating the index associated with the second plurality of bits, wherein the first group of bits and the second group of bits have the same size based at least in part on the selected values.

Aspect 8: The method of aspect 7, further comprising: identifying one or more bits for reassignment from the first group of bits to the second group of bits, the one or more bits being identified based at least in part on a difference between a first original quantity of bits of the first group of bits and a second original quantity of bits of the second group of bits, wherein the first original quantity of bits is different than the second original quantity of bits; and determining the values for the second subset of bits based at least in part on the identified one or more bits for reassignment.

Aspect 9: The method of any of aspects 7 through 8, further comprising: determining the values for the second subset of bits based at least in part on randomly selecting a portion of bits from the first group of bits for reassignment to the second group of bits.

Aspect 10: The method of any of aspects 7 through 9, wherein the second subset of bits includes one or more dummy bits.

Aspect 11: The method of any of aspects 6 through 10, wherein the first quantity of bits for the first subset of bits further includes one or more bits from a second subset of bits of the first plurality of bits, the one or more bits comprise bits that are located after a bit of the second subset of bits that has a modified value.

Aspect 12: The method of any of aspects 6 through 11, further comprising: transmitting an indication of the quantity of bits for the first subset of bits.

Aspect 13: The method of any of aspects 1 through 12, wherein obtaining the plurality of candidate partial transmit sequences further comprises: obtaining a sum of the first output and the second output; and generating the plurality of candidate partial transmit sequences in accordance with the obtained sum.

Aspect 14: The method of any of aspects 1 through 13, further comprising: selecting the partial transmit sequence from the plurality of candidate partial transmit sequences based at least in part on comparing respective peak-to-average-power ratios for the plurality of candidate partial transmit sequences, wherein the selected partial transmit sequence is associated with a lowest peak-to-average-power ratio of the respective peak-to-average-power ratios.

Aspect 15: The method of any of aspects 1 through 14, wherein the first group of bits are orthogonal to the second group of bits based at least in part on one or more modulation schemes.

Aspect 16: A method for wireless communication, comprising: receiving a first plurality of bits and a second plurality of bits in accordance with a partial transmit sequence, the first plurality of bits indicating an index associated with the second plurality of bits in at least one subcarrier, and the second plurality of bits including a first group of bits and a second group of bits; and combining the first plurality of bits and the second plurality of bits based at least in part on the partial transmit sequence to obtain information bits of a signal.

Aspect 17: The method of aspect 16, further comprising: receiving an indication of a first phase rotations for the first group of bits and a second phase rotation for the second group of bits.

Aspect 18: The method of any of aspects 16 through 17, further comprising: receiving an indication of a quantity of bits for a first subset of bits of the first plurality of bits.

Aspect 19: The method of any of aspects 16 through 18, wherein the first group of bits are orthogonal to the second group of bits based at least in part on one or more modulation schemes.

Aspect 20: An apparatus for wireless communication at a wireless device, comprising a processor; memory coupled with the processor; and instructions stored in the memory and executable by the processor to cause the apparatus to perform a method of any of aspects 1 through 15.

Aspect 21: An apparatus for wireless communication at a wireless device, comprising at least one means for performing a method of any of aspects 1 through 15.

Aspect 22: A non-transitory computer-readable medium storing code for wireless communication at a wireless device, the code comprising instructions executable by a processor to perform a method of any of aspects 1 through 15.

Aspect 23: An apparatus for wireless communication, comprising a processor; memory coupled with the processor; and instructions stored in the memory and executable by the processor to cause the apparatus to perform a method of any of aspects 16 through 19.

Aspect 24: An apparatus for wireless communication, comprising at least one means for performing a method of any of aspects 16 through 19.

Aspect 25: A non-transitory computer-readable medium storing code for wireless communication, the code comprising instructions executable by a processor to perform a method of any of aspects 16 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a wireless device, comprising:
    identifying a first plurality of bits of information bits of a signal, the first plurality of bits indicating an index associated with a second plurality of bits of the information bits of the signal;
    identifying the second plurality of bits, wherein the second plurality of bits includes a first group of bits and a second group of bits;
    obtaining a plurality of candidate partial transmit sequences based at least in part on a first phase rotation applied to a first output of an inverse Fast Fourier Transform of the first group of bits and a second phase rotation applied to a second output of an inverse Fast Fourier Transform of the second group of bits, the first group of bits and the second group of bits having a same size; and
    transmitting the signal based at least in part on selecting a partial transmit sequence from the plurality of candidate partial transmit sequences.

2. The method of claim 1, further comprising:
    transmitting an indication of the first phase rotation and the second phase rotation based at least in part on selecting the first phase rotation for the first group of bits and the second phase rotation for the second group of bits.

3. The method of claim 1, further comprising:
    identifying, for a time interval, a threshold quantity of bits for the first group of bits and the second group of bits, wherein the first group of bits and the second group of bits have the same size based at least in part on the first group of bits including at least the threshold quantity of bits during the time interval and the second group of bits including at least the threshold quantity of bits during the time interval.

4. The method of claim 3, wherein the threshold quantity of bits is based at least in part on one or more statistics associated with the information bits.

5. The method of claim 3, wherein the threshold quantity of bits corresponds to a minimum quantity of bits of either the first group of bits or the second group of bits.

6. The method of claim 3, further comprising:
    determining a first quantity of bits for a first subset of bits of the first plurality of bits, the first quantity of bits being based at least in part on a product of the threshold quantity of bits and a quantity of groups associated with the second plurality of bits.

7. The method of claim 6, further comprising:
determining a second quantity of bits for a second subset of bits of the first plurality of bits, the second quantity of bits comprising a difference between a total quantity of bits of the first plurality of bits and the first quantity of bits of the first subset of bits, wherein the first plurality of bits includes the first subset of bits and the second subset of bits; and
selecting values for the second subset of bits for indicating the index associated with the second plurality of bits, wherein the first group of bits and the second group of bits have the same size based at least in part on the selected values.

8. The method of claim 7, further comprising:
identifying one or more bits for reassignment from the first group of bits to the second group of bits, the one or more bits being identified based at least in part on a difference between a first original quantity of bits of the first group of bits and a second original quantity of bits of the second group of bits, wherein the first original quantity of bits is different than the second original quantity of bits; and
determining the values for the second subset of bits based at least in part on the identified one or more bits for reassignment.

9. The method of claim 7, further comprising:
determining the values for the second subset of bits based at least in part on randomly selecting a portion of bits from the first group of bits for reassignment to the second group of bits.

10. The method of claim 7, wherein the second subset of bits includes one or more dummy bits.

11. The method of claim 6, wherein:
the first quantity of bits for the first subset of bits further includes one or more bits from a second subset of bits of the first plurality of bits; and
the one or more bits comprise bits that are located after a bit of the second subset of bits that has a modified value.

12. The method of claim 6, further comprising:
transmitting an indication of the quantity of bits for the first subset of bits.

13. The method of claim 1, wherein obtaining the plurality of candidate partial transmit sequences further comprises:
obtaining a sum of the first output and the second output; and
generating the plurality of candidate partial transmit sequences in accordance with the obtained sum.

14. The method of claim 1, further comprising:
selecting the partial transmit sequence from the plurality of candidate partial transmit sequences based at least in part on comparing respective peak-to-average-power ratios for the plurality of candidate partial transmit sequences, wherein the selected partial transmit sequence is associated with a lowest peak-to-average-power ratio of the respective peak-to-average-power ratios.

15. The method of claim 1, wherein the first group of bits are orthogonal to the second group of bits based at least in part on one or more modulation schemes.

16. A method for wireless communication, comprising:
receiving a first plurality of bits and a second plurality of bits in accordance with a partial transmit sequence, the first plurality of bits indicating an index associated with the second plurality of bits in at least one subcarrier, and the second plurality of bits including a first group of bits and a second group of bits; and
combining the first plurality of bits and the second plurality of bits based at least in part on the partial transmit sequence to obtain information bits of a signal.

17. The method of claim 16, further comprising:
receiving an indication of a first phase rotations for the first group of bits and a second phase rotation for the second group of bits.

18. The method of claim 16, further comprising:
receiving an indication of a quantity of bits for a first subset of bits of the first plurality of bits.

19. The method of claim 16, wherein the first group of bits are orthogonal to the second group of bits based at least in part on one or more modulation schemes.

20. An apparatus for wireless communication at a wireless device, comprising:
a processor;
memory coupled with the processor; and
instructions stored in the memory and executable by the processor to cause the apparatus to:
identify a first plurality of bits of information bits of a signal, the first plurality of bits indicating an index associated with a second plurality of bits of the information bits of the signal;
identify the second plurality of bits, wherein the second plurality of bits includes a first group of bits and a second group of bits;
obtain a plurality of candidate partial transmit sequences based at least in part on a first phase rotation applied to a first output of an inverse Fast Fourier Transform of the first group of bits and a second phase rotation applied to a second output of an inverse Fast Fourier Transform of the second group of bits, the first group of bits and the second group of bits having a same size; and
transmit the signal based at least in part on selecting a partial transmit sequence from the plurality of candidate partial transmit sequences.

21. The apparatus of claim 20, wherein the instructions are further executable by the processor to cause the apparatus to:
transmit an indication of the first phase rotation and the second phase rotation based at least in part on selecting the first phase rotation for the first group of bits and the second phase rotation for the second group of bits.

22. The apparatus of claim 20, wherein the instructions are further executable by the processor to cause the apparatus to:
identify, for a time interval, a threshold quantity of bits for the first group of bits and the second group of bits, wherein the first group of bits and the second group of bits have the same size based at least in part on the first group of bits including at least the threshold quantity of bits during the time interval and the second group of bits including at least the threshold quantity of bits during the time interval.

23. The apparatus of claim 22, wherein the instructions are further executable by the processor to cause the apparatus to:
determine a first quantity of bits for a first subset of bits of the first plurality of bits, the first quantity of bits being based at least in part on a product of the threshold quantity of bits and a quantity of groups associated with the second plurality of bits.

24. The apparatus of claim 23, wherein the instructions are further executable by the processor to cause the apparatus to:
- determine a second quantity of bits for a second subset of bits of the first plurality of bits, the second quantity of bits comprising a difference between a total quantity of bits of the first plurality of bits and the first quantity of bits of the first subset of bits, wherein the first plurality of bits includes the first subset of bits and the second subset of bits; and
- select values for the second subset of bits for indicating the index associated with the second plurality of bits, wherein the first group of bits and the second group of bits have the same size based at least in part on the selected values.

25. The apparatus of claim 24, wherein the instructions are further executable by the processor to cause the apparatus to:
- identify one or more bits for reassignment from the first group of bits to the second group of bits, the one or more bits being identified based at least in part on a difference between a first original quantity of bits of the first group of bits and a second original quantity of bits of the second group of bits, wherein the first original quantity of bits is different than the second original quantity of bits; and
- determine the values for the second subset of bits based at least in part on the identified one or more bits for reassignment.

26. The apparatus of claim 24, wherein the instructions are further executable by the processor to cause the apparatus to:
- determine the values for the second subset of bits based at least in part on randomly selecting a portion of bits from the first group of bits for reassignment to the second group of bits.

27. The apparatus of claim 23, wherein the instructions are further executable by the processor to cause the apparatus to:
- transmit an indication of the quantity of bits for the first subset of bits.

28. The apparatus of claim 20, wherein obtaining the plurality of candidate partial transmit sequences further comprises:
- obtaining a sum of the first output and the second output; and
- generating the plurality of candidate partial transmit sequences in accordance with the obtained sum.

29. The apparatus of claim 20, wherein the instructions are further executable by the processor to cause the apparatus to:
- select the partial transmit sequence from the plurality of candidate partial transmit sequences based at least in part on comparing respective peak-to-average-power ratios for the plurality of candidate partial transmit sequences, wherein the selected partial transmit sequence is associated with a lowest peak-to-average-power ratio of the respective peak-to-average-power ratios.

30. An apparatus for wireless communication, comprising:
- a processor;
- memory coupled with the processor; and
- instructions stored in the memory and executable by the processor to cause the apparatus to:
  - receive a first plurality of bits and a second plurality of bits in accordance with a partial transmit sequence, the first plurality of bits indicating an index associated with the second plurality of bits in at least one subcarrier, and the second plurality of bits including a first group of bits and a second group of bits; and
  - combine the first plurality of bits and the second plurality of bits based at least in part on the partial transmit sequence to obtain information bits of a signal.

* * * * *